United States Patent [19]
Sato

[11] Patent Number: 5,841,645
[45] Date of Patent: Nov. 24, 1998

[54] MULTI-LEVEL INVERTER WITH LOW LOSS SNUBBING CIRCUITS

[75] Inventor: Shinji Sato, Tokyo, Japan

[73] Assignee: Kabushiki Kaisha Toshiba, Kawasaki, Japan

[21] Appl. No.: 841,388

[22] Filed: Apr. 30, 1997

[30] Foreign Application Priority Data

Jun. 3, 1996 [JP] Japan ................................. 8-139798

[51] Int. Cl.⁶ .................................................. H02M 1/12
[52] U.S. Cl. .............................................. 363/43; 363/132
[58] Field of Search ................................. 363/430, 131, 363/132

[56] References Cited

U.S. PATENT DOCUMENTS

| | | | |
|---|---|---|---|
| 3,100,851 | 8/1963 | Ross et al. ................................. | 363/43 |
| 3,832,643 | 8/1974 | Van Heyningen et al. .............. | 363/43 |
| 3,867,643 | 2/1975 | Baker et al. .............................. | 363/43 |
| 4,203,151 | 5/1980 | Baker ....................................... | 363/132 |
| 4,344,123 | 8/1982 | Bhagwat et al. ......................... | 363/43 |
| 4,467,407 | 8/1984 | Asano et al. ............................. | 363/43 |
| 4,680,690 | 7/1987 | Dickerson ................................. | 363/43 |
| 4,685,043 | 8/1987 | Mehnert ................................... | 363/43 |
| 4,737,901 | 4/1988 | Woodward ............................... | 363/43 |
| 5,155,675 | 10/1992 | Maruyama et al. ..................... | 363/132 |
| 5,483,433 | 1/1996 | Yang ........................................ | 363/43 |

*Primary Examiner*—Jeffrey L. Sterrett
*Attorney, Agent, or Firm*—Oblon, Spivak, McClelland, Maier & Neustadt, P.C.

[57] ABSTRACT

A multi-level inverter, including an AC output terminal, at least four DC input terminals with different potentials having a first DC input terminal with a maximum potential and a second DC input terminal with a minimum potential, a positive arm connected between the first DC input terminal and the AC output terminal, and a negative arm connected between the second DC input terminal and the AC output terminal. Each of the positive and negative arms is composed of a plurality of series connected switching devices, respectively. The multi-level inverter further includes a plurality of clamp diodes, each connected between one of the DC input terminals other than the first and second DC input terminals and one of the positive and negative arms, respectively, a plurality of first snubber circuits, each composed of a series circuit of a snubber capacitor and a snubber diode and connected in parallel with one of the switching devices, respectively, and a plurality of discharging circuits, each composed of at least a resistor and connected between one of the first snubber circuits and the DC input terminals, respectively.

9 Claims, 20 Drawing Sheets

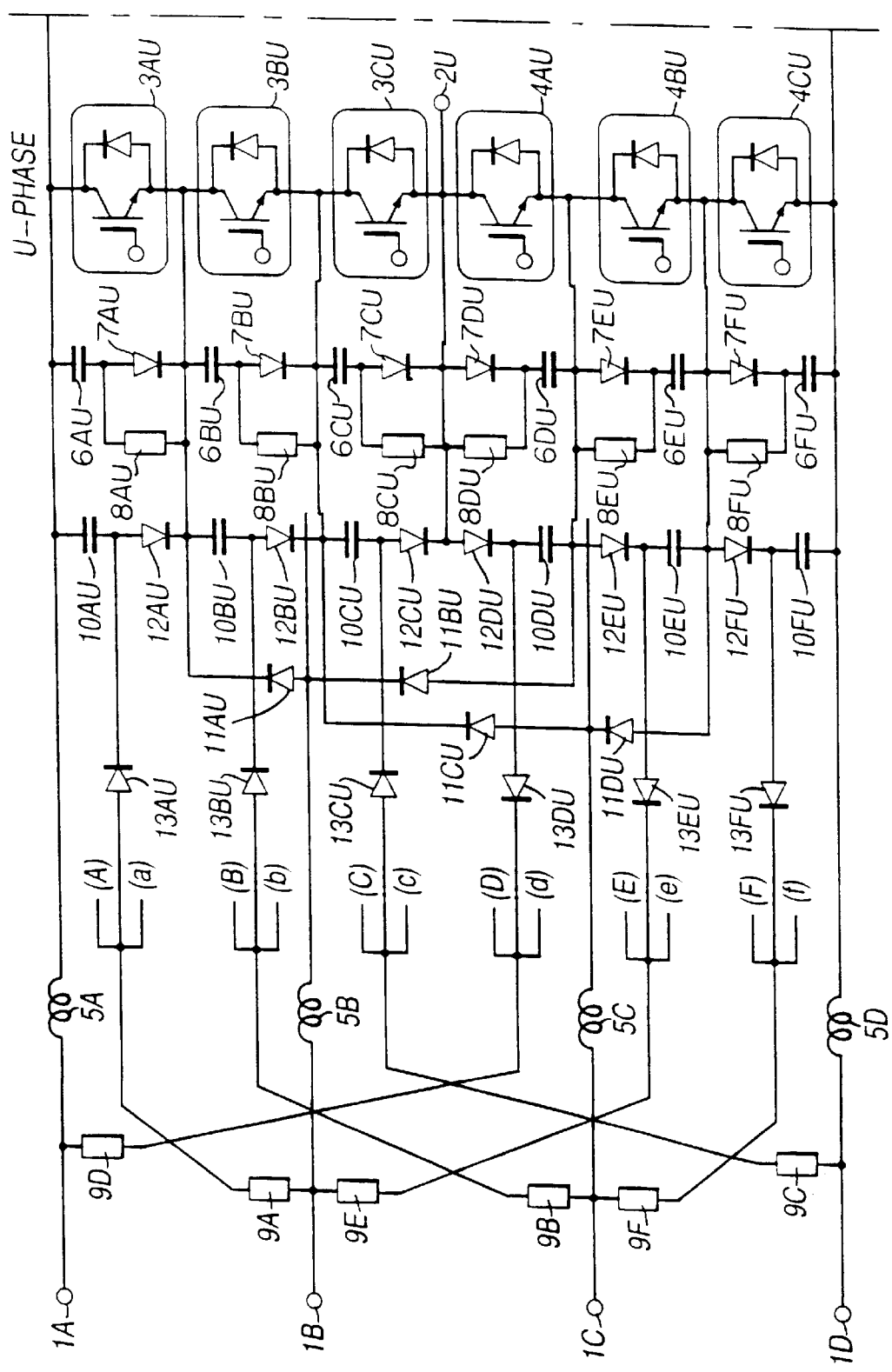
Fig. 4B(1)

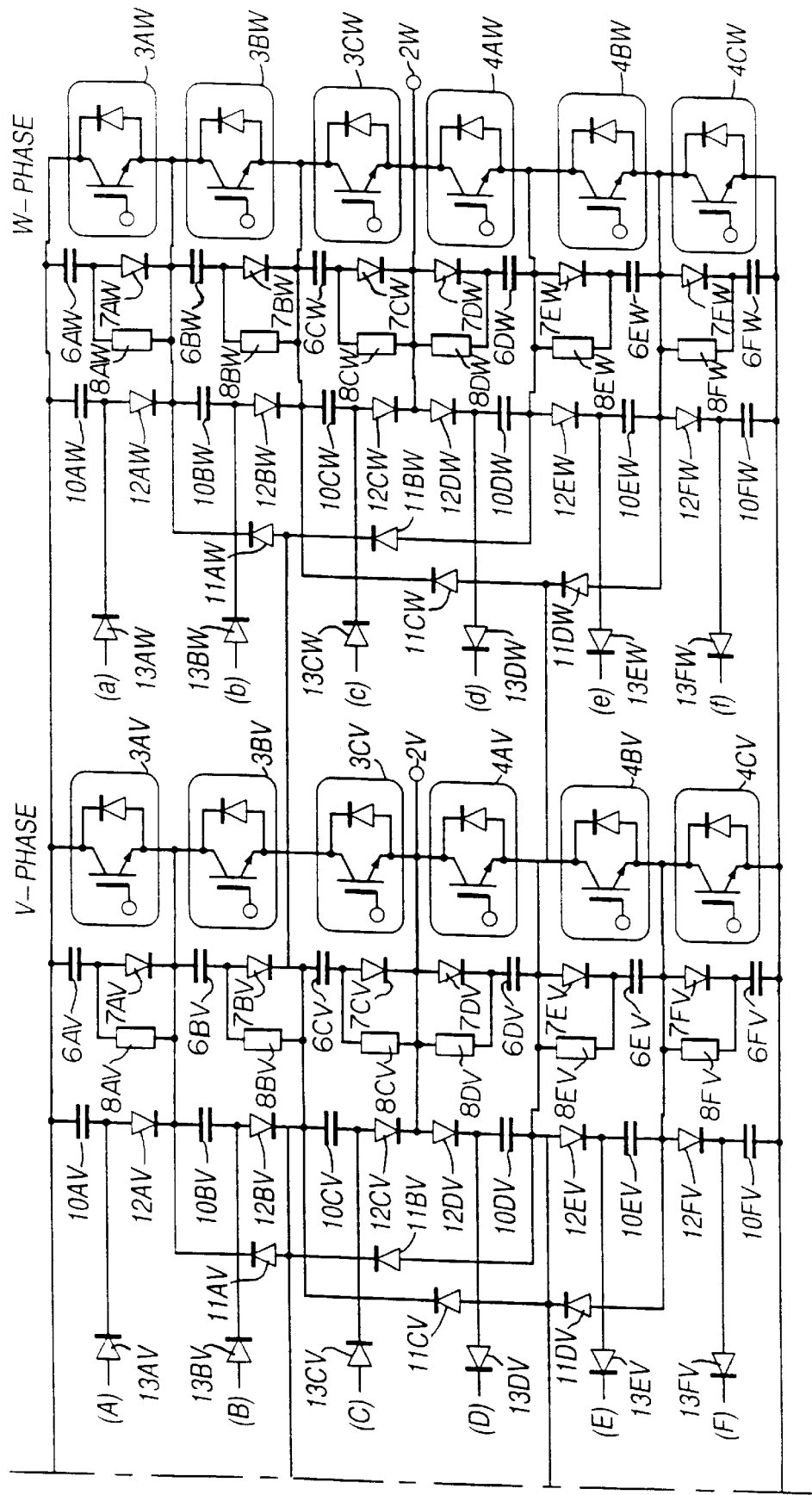
Fig. 4B(2)

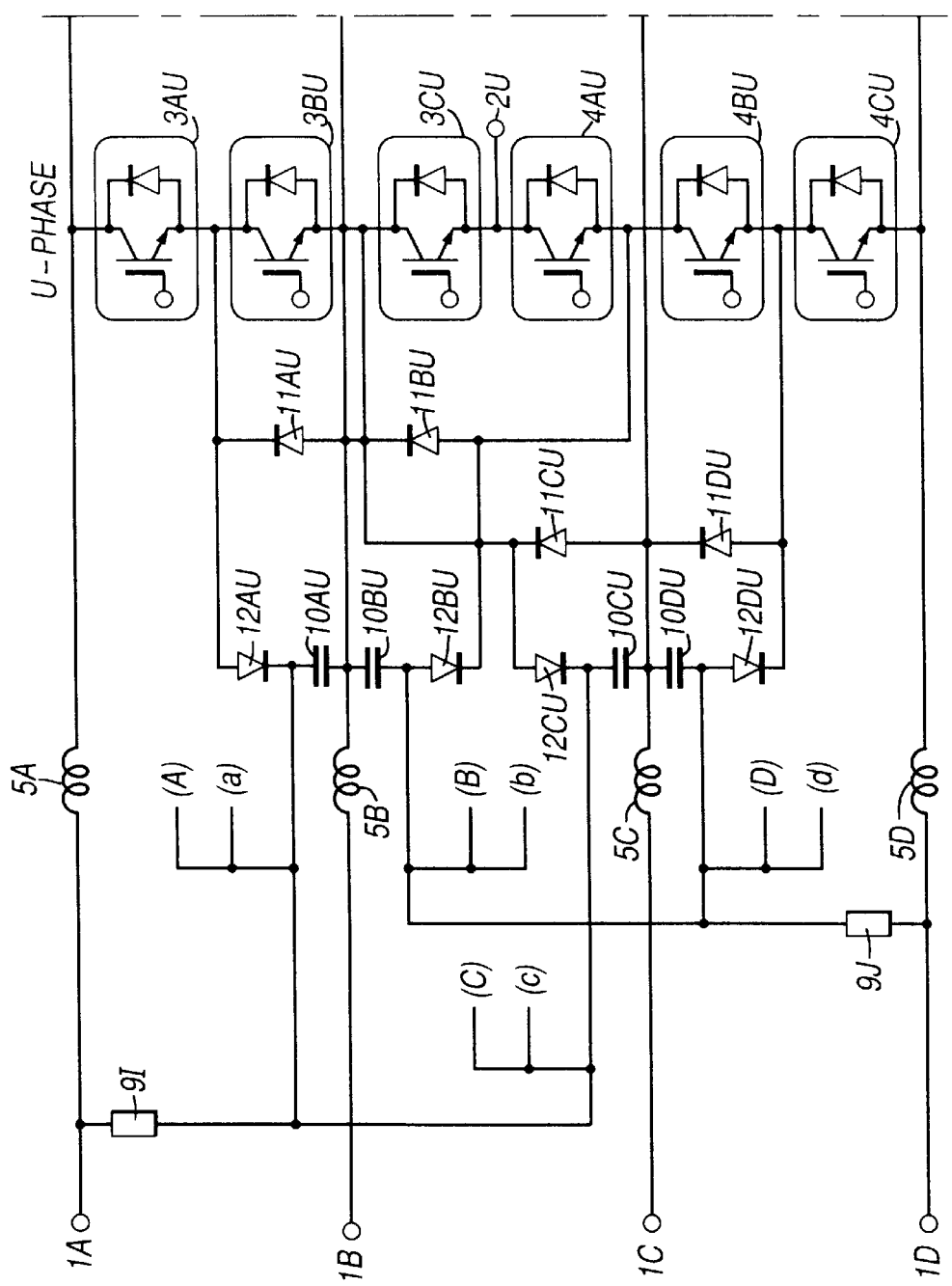
Fig. 10A(1)

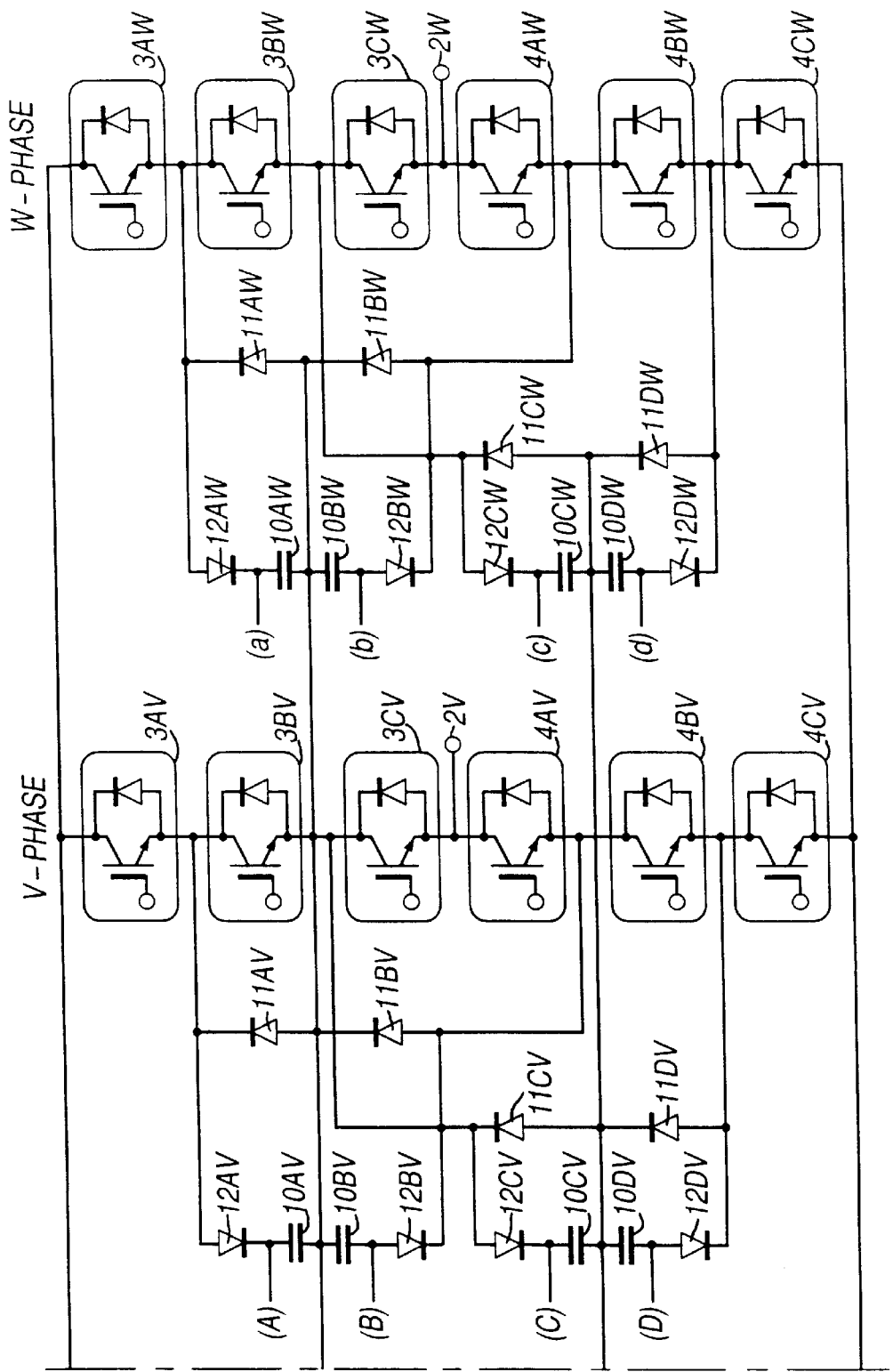
Fig. 10A(2)

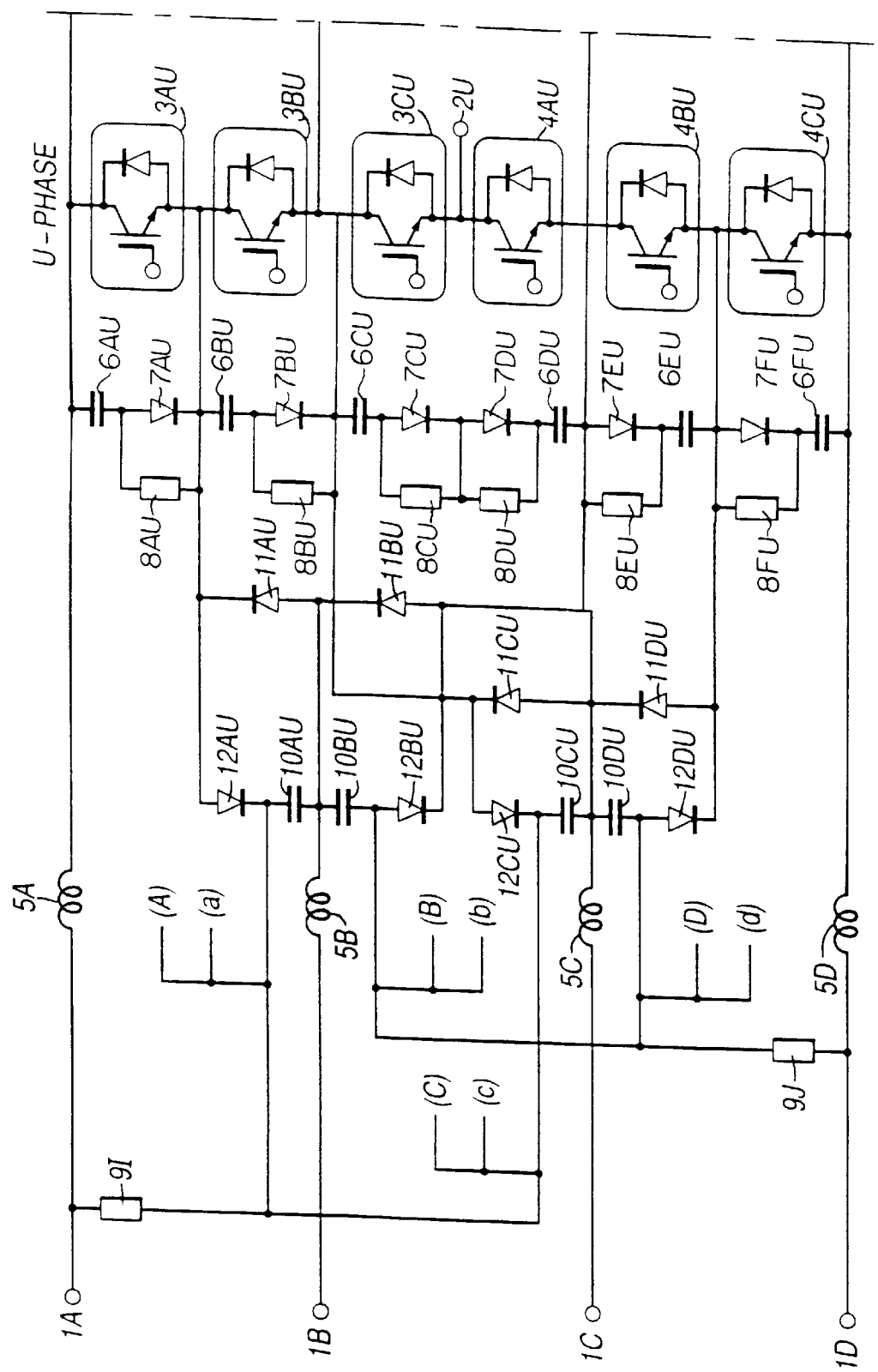
Fig. 10B(1)

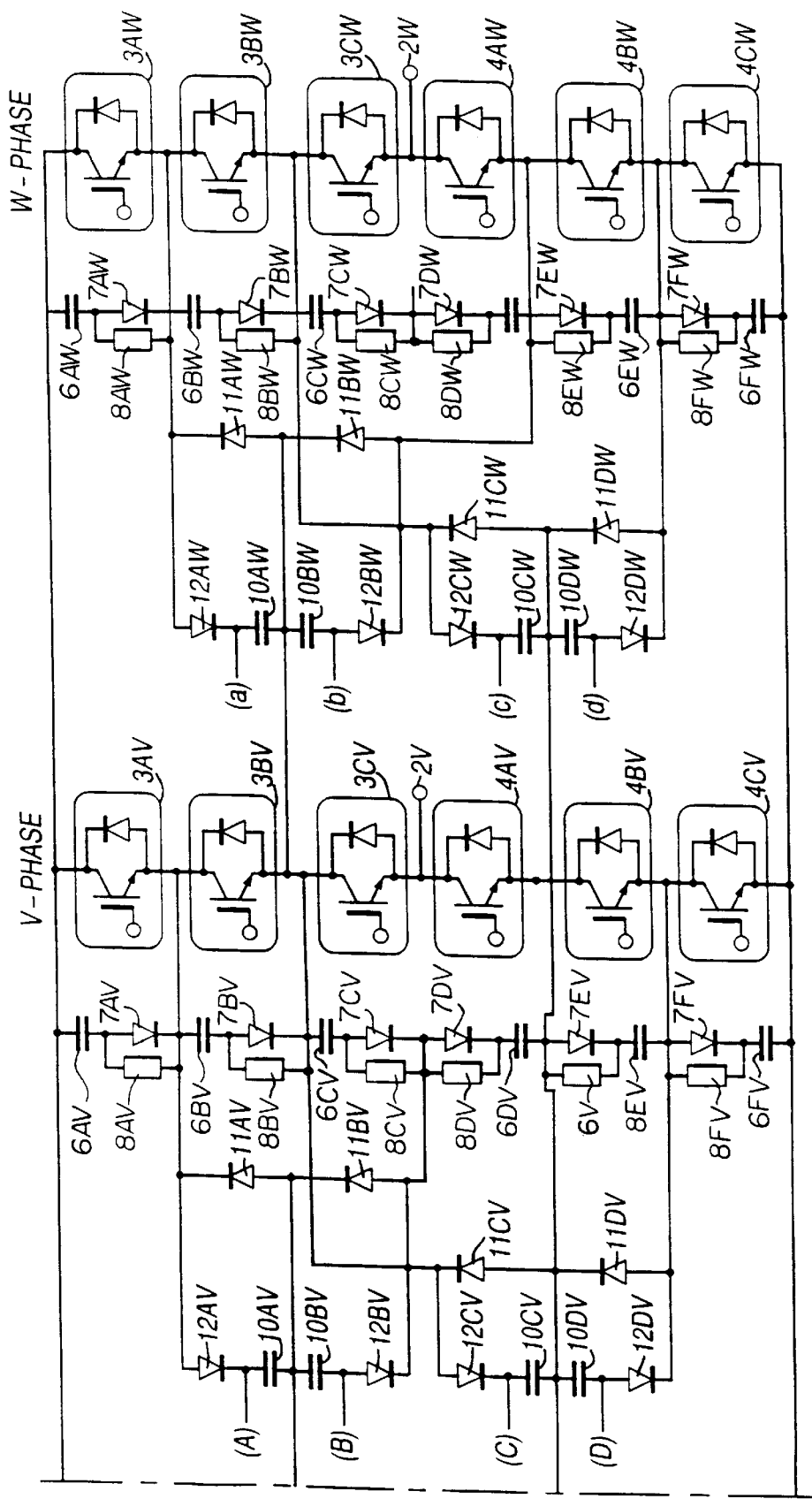
Fig. 10B(2)

MULTI-LEVEL INVERTER WITH LOW LOSS SNUBBING CIRCUITS

BACKGROUND OF THE INVENTION

1. Field of the Invention

This invention relates to a multi-level inverter, and more particularly to a multi-level inverter which can suppress snubber loss.

2. Description of the Related Art

Inverters to convert DC electric power into AC electric power are used in uninterruptible power supplies, frequency changers and the like. Among inverters, multi-level inverters of more than three level outputs are capable of converting larger voltage than voltages handled by switches composing the multi-level inverters, and furthermore are capable of obtaining output waveforms of better quality as being able to output intermediate potentials when compared with normal two-level output inverters.

In an inverter, each switch is provided with a snubber circuit to prevent overvoltage. If no snubber circuit is provided in the inverter, switches may be damaged as surge voltage is generated at each switch during the switching operation.

A four-level inverter using charging/discharging snubber circuits is shown in FIG. 11. In FIG. 11, there are provided DC input terminals 1A–1D, an AC output terminal 2, positive side reverse-conducting switches 3A–3C, and negative side reverse-conducting switches 4A–4C. There are further provided stray inductances 5A–5D, charging/discharging snubber circuits composed of charging/discharging snubber capacitors 6A–6F, charging/discharging snubber diodes 7A–7F and charging/discharging snubber resistor 7A–8F, respectively, and clamp diodes 11A–11D.

When reverse-conducting switches 3A–3C, 4A–4C are turned ON/OFF, four level potentials equivalent to potentials of four DC input terminals 1A–1D are generated at AC output terminal 2.

If positive reverse-conducting switch 3A is turned OFF in the state wherein current is flowing to AC output terminal 2 through stray inductance 5A and positive reverse-conducting switches 3A, 3B, 3C, a voltage of positive side reverse-conducting switch 3A is increased by residual energy of stray inductance 5A. If this voltage exceeds a voltage of charging/discharging snubber capacitor 6A, forward voltage is applied to charging/discharging snubber diode 7A and it becomes the ON state. As a result, residual energy of stray inductance 5A flows into and is absorbed by charging/discharging snubber capacitor 6A. At this time, the voltage of positive side reverse-conducting switch 3A is clamped by the voltage of charging/discharging snubber capacitor 6A. The voltage of charging/discharging snubber capacitor 6A is discharged to 0 volts by charging/discharging snubber resistor 8A when positive side reverse-conducting switch 3A is in the ON state.

FIG. 12 and FIG. 13 show three-level inverters using clamp snubber circuits and are parts of the circuits presented in the 1995 National Meeting of the Institute of Electrical Engineers of Japan Report 1178, respectively.

In FIG. 12, there are provided DC input terminals 1A–1C, AC output terminal 2, positive side reverse-conducting switches 3A–3B, and negative side reverse-conducting switches 4A–4B. There are further provided stray inductances 5A–5C, clamp snubber circuits composed of clamp snubber capacitors 10A–10D and clamp snubber diodes 12A–12D, respectively, clamp diodes 11A–11B, clamp snubber resistors 9A–9D and diodes 13A, 13B.

In FIG. 12, assuming that each voltage between DC input terminals 1A–1C is VDC, a voltage of a clamp snubber capacitor 10A is kept to VDC by clamp snubber resistor 9A and a maximum voltage of positive side reverse-conducting switch 3A becomes VDC. Similarly, a maximum voltage of positive side reverse-conducting switch 3B is made to VDC by clamp snubber resistor 9B.

In FIG. 13, there are provided DC input terminals 1A–1C, AC output terminal 2, positive side reverse-conducting switches 3A–3B, and negative side reverse-conducting switches 4A–4B. There are further provided stray inductances 5A–5C, clamp snubber circuits composed of clamp snubber capacitors 10A–10B and clamp snubber diodes 12A–12B, respectively, clamp diodes 11A–11B, and clamp snubber resistors 9A–9B.

In FIG. 13, assuming that each voltage between DC input terminals 1A–1C is VDC, a voltage of clamp snubber capacitor 10A is kept to VDC by clamp snubber resistor 9A and a maximum voltage of clamp diode 11A becomes VDC. Similarly, a voltage of clamp snubber capacitor 10B is kept to VDC by clamp snubber resistor 9B and a maximum voltage of clamp diode 11B becomes VDC.

However, in a conventional multi-level inverter using conventional charging/discharging snubber circuits as shown in FIG. 11, there was such a problem that snubber loss by charging/discharging snubber resistors becomes large and power conversion efficiency can not be increased.

In addition, as for conventional multi-level inverters using conventional clamp snubber circuits as shown in FIGS. 12 and 13, they have not been applied to four-level or more inverters. Therefore, charging/discharging snubber circuits are used in a multi-level inverter of four-level or more outputs.

SUMMARY OF THE INVENTION

Accordingly, one object of this invention is to provide a multi-level inverter of four-level outputs or more which can suppress surge voltages and thereby can suppress the loss of snubber circuits in the multi-level inverter, using clamp snubber circuits.

These and other objects of this invention can be achieved by providing a multi-level inverter, including an AC output terminal, at least four DC input terminals with different potentials having a first DC input terminal with a maximum potential and a second DC input terminal with a minimum potential, a positive arm connected between the first DC input terminal and the AC output terminal, and a negative arm connected between the second DC input terminal and the AC output terminal. Each of the positive and negative arms is composed of a plurality of series connected switching devices, respectively. The multi-level inverter further includes a plurality of clamp diodes, each connected between one of the DC input terminals other than the first and second DC input terminals and one of the positive and negative arms, respectively, a plurality of first snubber circuits, each composed of a series circuit of a snubber capacitor and a snubber diode and connected in parallel with one of the switching devices, respectively, and a plurality of discharging circuits, each composed of at least a resistor and connected between one of the first snubber circuits and the DC input terminals, respectively.

According to one aspect of this invention, there is provided a multi-phase multi-level inverter, including at least four DC input terminals with different potentials having a first DC input terminal with a maximum potential and a second DC input terminal with a minimum potential, and a plurality of stacks. Each of the stacks includes an AC output terminal, a positive arm connected between the first DC input terminal and the AC output terminal, and a negative arm connected between the second DC input terminal and the AC output terminal. Each of the positive and negative arms is composed of a plurality of series connected switching devices, respectively. Each of the stacks further includes a plurality of clamp diodes, each connected between one of the DC input terminals other than the first and second DC input terminals and one of the positive and negative arms, respectively, and a plurality of first snubber circuits, each composed of a series circuit of a snubber capacitor and a snubber diode and connected in parallel with one of the switching devices, respectively. The multi-phase multi-level inverter further includes a plurality of discharging circuits, each composed of at least a resistor and connected between one of the first snubber circuits of one of the stacks and the DC input terminals, respectively.

According to another embodiment of this invention, there is provided a multi-level inverter, including an AC output terminal, at least four DC input terminals with different potentials having a first DC input terminal with a maximum potential and a second DC input terminal with a minimum potential, a positive arm connected between the first DC input terminal and the AC output terminal, and a negative arm connected between the second DC input terminal and the AC output terminal. Each of the positive and negative arms is composed of a plurality of series connected switching devices, respectively. The multi-level inverter further includes a plurality of clamp diodes, each connected between one of the DC input terminals other than the first and second DC input terminals and one of the positive and negative arms, respectively, a plurality of first snubber circuits, each composed of a series circuit of a snubber capacitor and a snubber diode and connected in parallel with one of the clamp diodes, respectively, and a plurality of discharging circuits, each composed of at least a resistor and connected between one of the first snubber circuits and one of the first and second DC input terminals, respectively.

According to a further embodiment of this invention, there is provided a multi-phase multi-level inverter, including at least four DC input terminals with different potentials having a first DC input terminal with a maximum potential and a second DC input terminal with a minimum potential and a plurality of stacks. Each of the stacks includes an AC output terminal, a positive arm connected between the first DC input terminal and the AC output terminal, and a negative arm connected between the second DC input terminal and the AC output terminal. Each of the positive and negative arms is composed of a plurality of series connected switching devices, respectively. Each of the stacks further includes a plurality of clamp diodes, each connected between one of the DC input terminals other than the first and second DC input terminals and one of the positive and negative arms, respectively, and a plurality of first snubber circuits, each composed of a series circuit of a snubber capacitor and a snubber diode and connected in parallel with one of the clamp diodes, respectively. The multi-phase multi-level inverter further includes a plurality of discharging circuits, each composed of at least a resistor and connected between one of the first snubber circuits in one of the stacks and one of the first and second DC input terminals, respectively.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 4B(1)–4B(2) are a modified version of the fourth embodiment;

FIGS. 10A(1) and 10A(2) are a circuit diagram showing a three-phase inverter according to a tenth embodiment of this invention;

FIGS. 10B(1) and 10B(2) are a modification of the tenth embodiment;

DETAILED DESCRIPTION OF THE PREFERRED EMBODIMENTS

Figure 1:
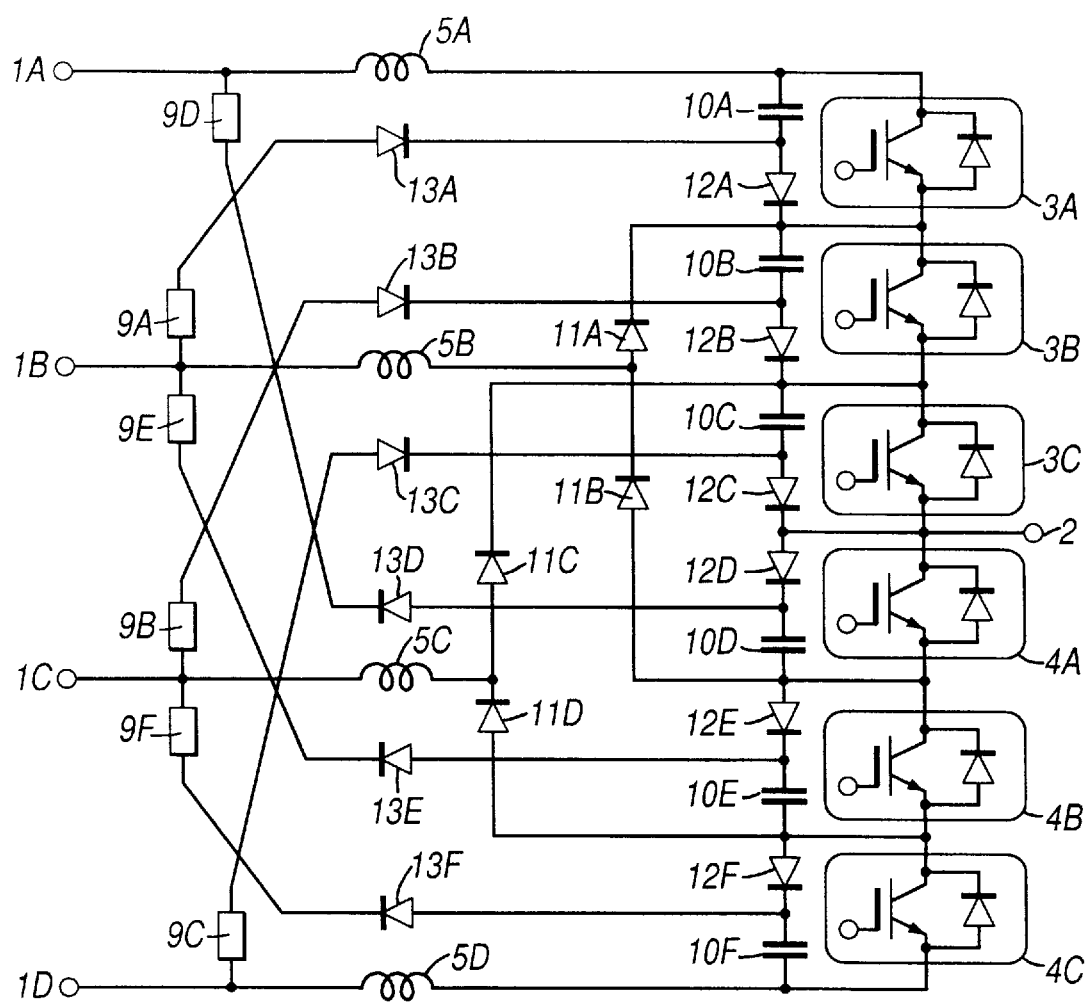
FIG. 1 is a circuit diagram showing a four-level inverter according to a first embodiment of this invention.

Referring now to the drawings, wherein like reference numerals designate identical or corresponding parts throughout the several views, the embodiments of this invention will be described below.

A first embodiment of this invention is described using FIG. 1. FIG. 1 shows a four-level inverter with clamp snubber circuits. In FIG. 1, there are provided DC input terminals 1A–1D, AC output terminal 2, a positive arm composed of series connected positive side reverse-conducting switches 3A–3C, and a negative arm composed of series connected negative side reverse-conducting switches 4A–4C. There are further provided stray inductances 5A–5D, clamp diodes 11A–11D, first snubber circuits such as clamp snubber circuits connected in parallel with reverse-conducting switches 3A–3C and 4A–4C composed of series connected clamp snubber capacitors 10A–10F and clamp snubber diodes 12A–12F, respectively, and discharging circuits composed of clamp snubber resistors 9A–9F and diodes 13A–13F, respectively.

In this multi-level inverter, AC output terminal 2 is capable of generating four level potentials equivalent to potentials of four DC input terminals 1A–1D when reverse-conducting switches 3A–3C, 4A–4C are turned ON/OFF. The circuit operation will be described in the following. Further, it is assumed here that potentials at DC input terminals 1A, 1B, 1C and 1D are VA, VB, VC and VD, respectively, and voltages between adjacent DC input terminals 1A–1D are equal, and VA=3×VDC, VB=2×VDC, VC=VDC and VD=0.

If positive side reverse-conducting switch 3A is turned OFF, a voltage of positive side reverse-conducting switch 3A is increased by the energy of stray inductance 5A. When the voltage of positive side reverse-conducting switch 3A exceeds a voltage of clamp snubber capacitor 10A, forward voltage is added to clamp snubber diode 12A, which is then turned to the ON state. As a result, the energy of stray inductance 5A flows to clamp snubber capacitor 10A. At this time, the voltage of positive side reverse-conducting switch 3A is clamped by the voltage of clamp snubber capacitor 10A. The voltage of clamp snubber capacitor 10A slightly increases in order to absorb the energy of stray inductance 5A, but it is discharged by clamp snubber resistor 9A to a voltage (VA−VB) through diode 13A.

An increase in the voltage of clamp snubber capacitor 10A can be suppressed by increasing the capacity of clamp snubber capacitor 10A, maximum voltage applied to positive side reverse-conducting switch 3A can be decreased to a voltage (VA−VB), that is, VDC.

The above-description with respect to positive side reverse-conducting switch 3A also applies to positive side reverse-conducting switch 3B, 3C and negative side reverse-conducting switch 4A–4C.

Further, although the operation when the reverse-conducting switches 3A–3C and 4A–4C are turned OFF is described in the above, when the reverse-conducting switches 3A–3C and 4A–4C are in the steady state or the ON state, maximum applied voltages to reverse-conducting switches 3A–3C and 4A–4C are clamped by the maximum voltages of respective clamp snubber capacitors 10A–10F.

As described above, it is possible to reduce maximum applied voltage of reverse-conducting switches 3A–3C and 4A–4C and thus, it becomes possible to suppress surge voltage and thereby to suppress the loss of snubber circuits. Furthermore, it becomes also possible to increase voltage utilization factor of reverse-conducting switches 3A–3C and 4A–4C (working voltage/withstand voltage of reverse-conducting switches) and to increase maximum conversion voltage of the inverter.

Figure 2:
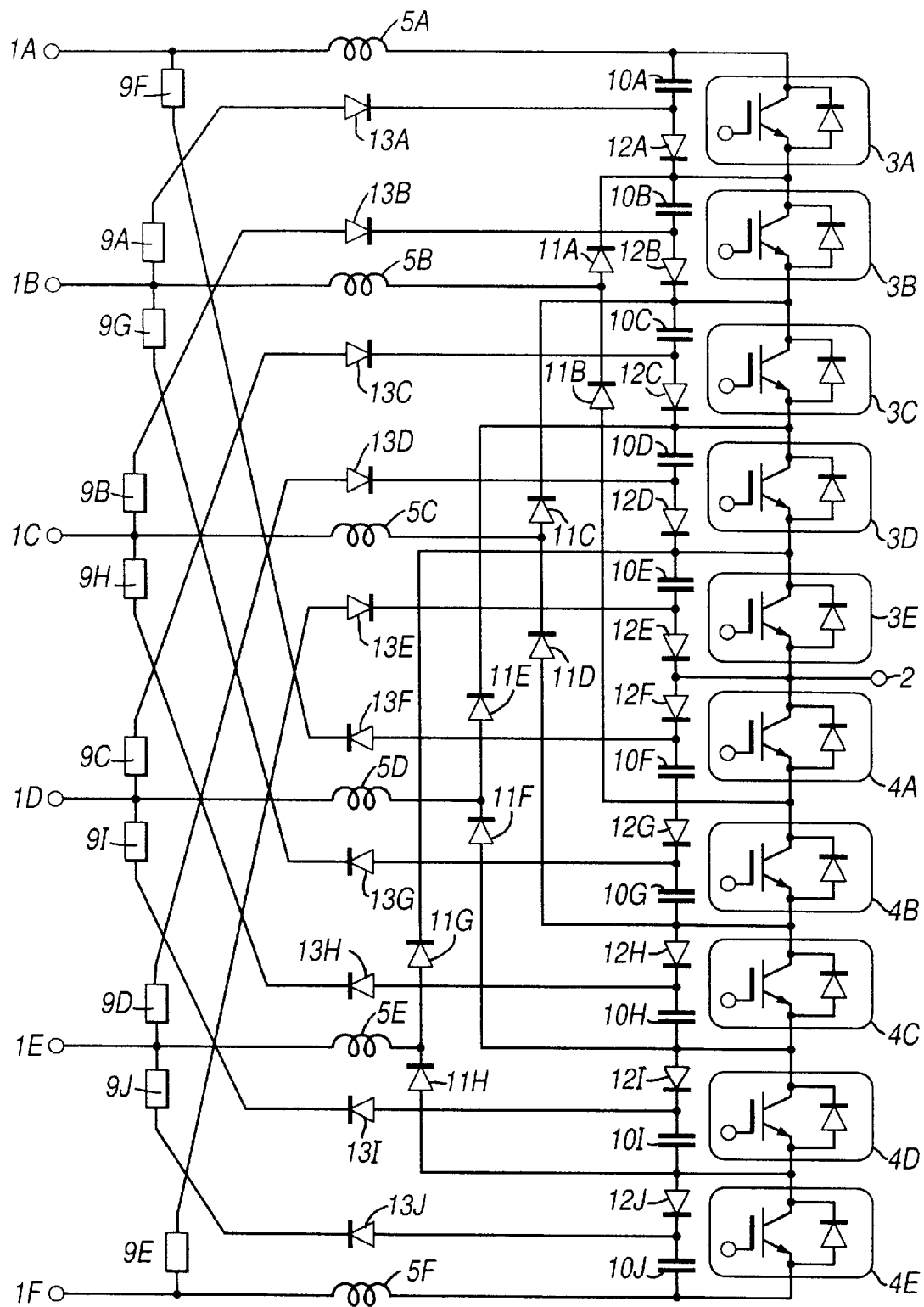
FIG. 2 is a circuit diagram showing a six-level inverter according to a second embodiment of this invention.

Next, a second embodiment of this invention is described using FIG. 2. This second embodiment is obtained by applying the first embodiment to a six-level inverter. In FIG. 2, there are provided DC input terminals 1A–1F, AC output terminal 2, a positive arm composed of series connected positive side reverse-conducting switches 3A–3E, and a negative arm composed of series connected negative side reverse-conducting switches 4A–4E. There are further provided stray inductances 5A–5F, clamp diodes 11A–11H, first snubber circuits such as clamp snubber circuits connected in parallel with reverse-conducting switches 3A–3E and 4A–4E composed of series connected clamp snubber capacitors 10A–10J and clamp snubber diodes 12A–12J, respectively, and discharging circuits composed of series connected clamp snubber resistors 9A–9J and diodes 13A–13J, respectively.

The circuit operations in the second embodiment are the same as the first embodiment. Even when the present invention is applied to a six-level inverter, it becomes possible to suppress loss of snubber circuits, and furthermore to increase maximum conversion voltage of an inverter.

Figure 3A:
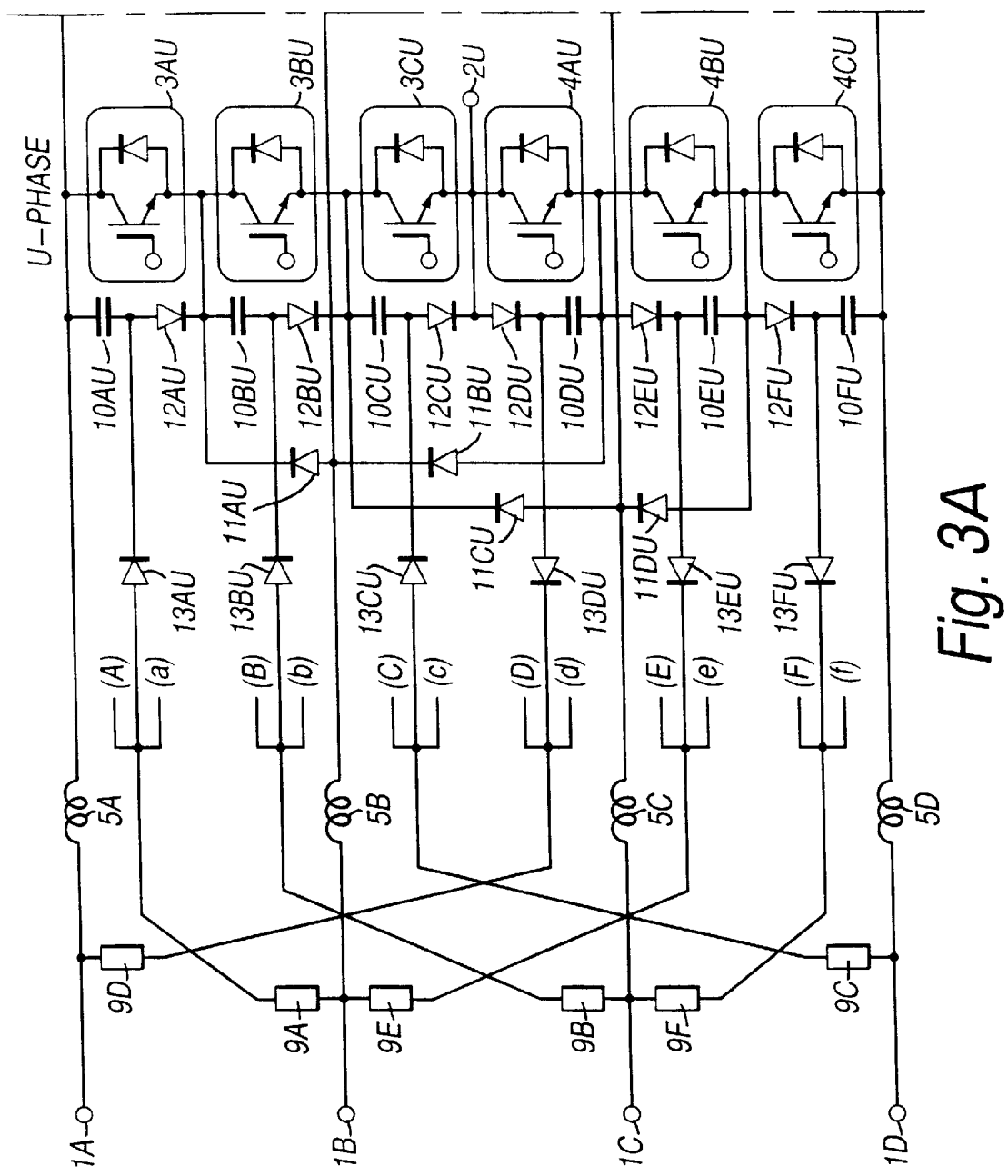
FIGS. 3A and 3B are circuit diagram showing a three-phase inverter according to a third embodiment of this invention.
Figure 3B:
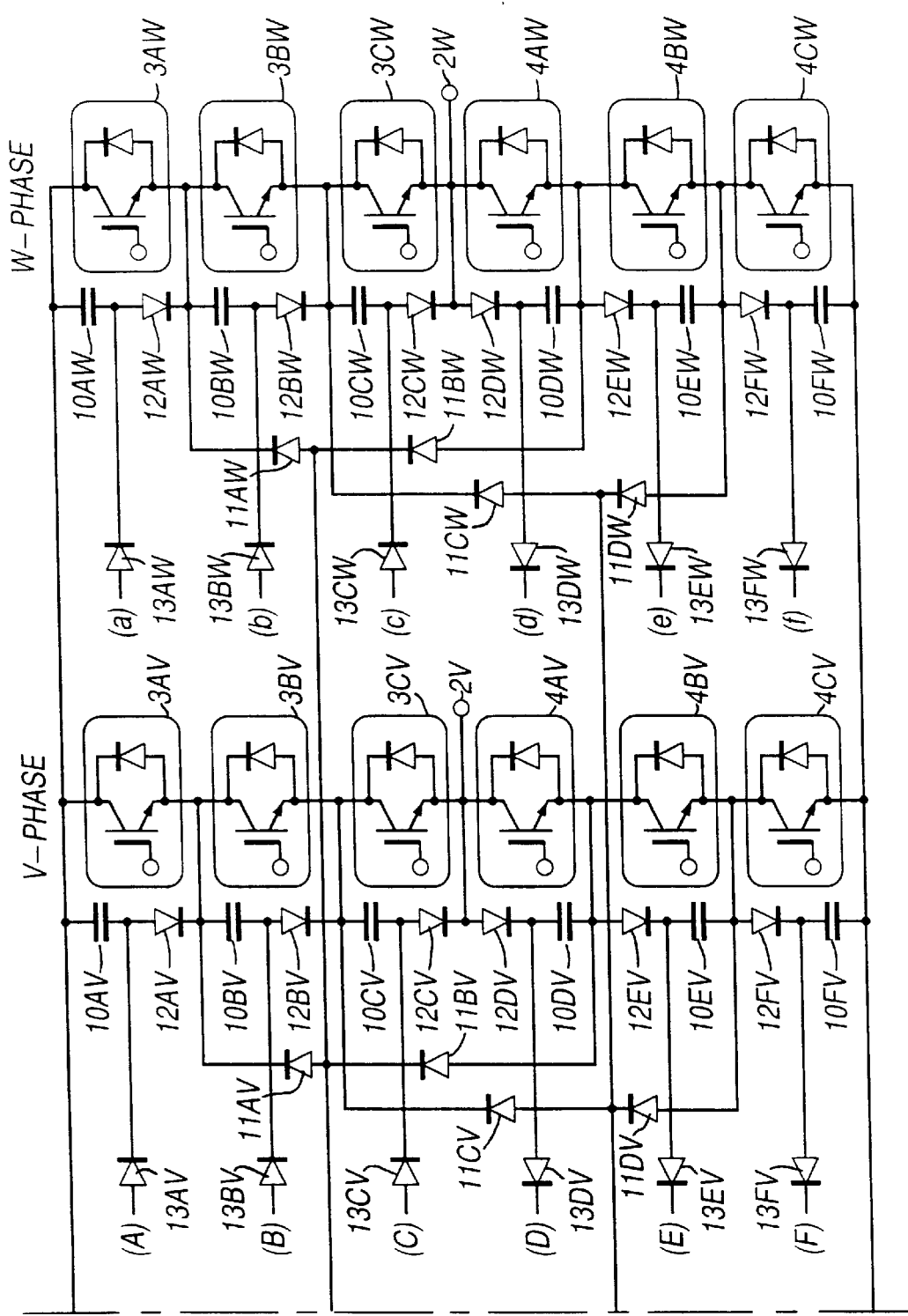

Next, a third embodiment of this invention is described using FIGS. 3A and 3B. This third embodiment is obtained by applying the first embodiment to a three-phase four-level inverter. Here, in FIGS. 3A and 3B, (A)–(F) and (a)–(f) are connected between the same reference numerals respectively. In FIGS. 3A and 3B, there are provided DC input terminals 1A–1D, stray inductances 5A–5D and clamp snubber resistors 9A–9F mutually in three U, V, W phases. As stacks of U, V, W phases, there are provided AC output terminal 2U, 2V, 2W, positive arms composed or groups of circuits of series connected positive side reverse-conducting switches 3AU–3CU, 3AV–3CV, 3AW–3CW and negative arms composed of series connected negative side reverse-conducting switches 4AU–4CU, 4AV–4CV, 4AW–4CW, clamp diodes 11AU–11DU, 11AV–11DV, 11AW–11DW, first snubber circuits such as clamp snubber circuits connected in parallel with reverse-conducting switches 3AU–3CU, 3AV–3CV, 3AW–3CW and 4AU–4CU, 4AV–4CV, 4AW–4CW composed of series connected clamp snubber capacitors 10AU–10FU, 10AV–10FV, 10AW–10FW and clamp snubber diodes 12AU–12FU, 12AV–12FV, 12AW–12FW, and diodes 13AU–13FU, 13AV–13FV, 13AW–13FW, respectively. Here, as for discharging circuits for U, V, W phases, series circuit of clamp snubber resistors 9A–9F mutually provided in three phases and diodes 13AU–13FU, 13AV–13 FV, 13AW–13FW provided for each phase compose discharging circuits for U, V, W phases, respectively.

The circuit operations of the third embodiment are the same as those in the first embodiment. As for the discharging, clamp snubber resistor 9A discharges clamp snubber capacitors 10AU, 10AV, 10AW via diodes 13AU, 13AV, 13AW of U, V, W phases, respectively. Similarly, clamp snubber resistors 9B–9F also discharge clamp snubber capacitors 10BU, 10BV, 10BW–10FU, 10FV, 10FW via diodes 13BU, 13BV, 13BW–13FU, 13FV, 13FW corresponding to U, V, W phases, respectively.

Thus, by collecting clamp snubber resistors in three phases into one, it becomes possible to reduce the number of clamp snubber resistors 9A–9F and simplify the circuits of the three-phase inverter. In this embodiment, the present invention applied to a three-phase inverter is shown. But this invention is also applicable to two-phase inverter or more than four-phase inverter.

Figure 4A:
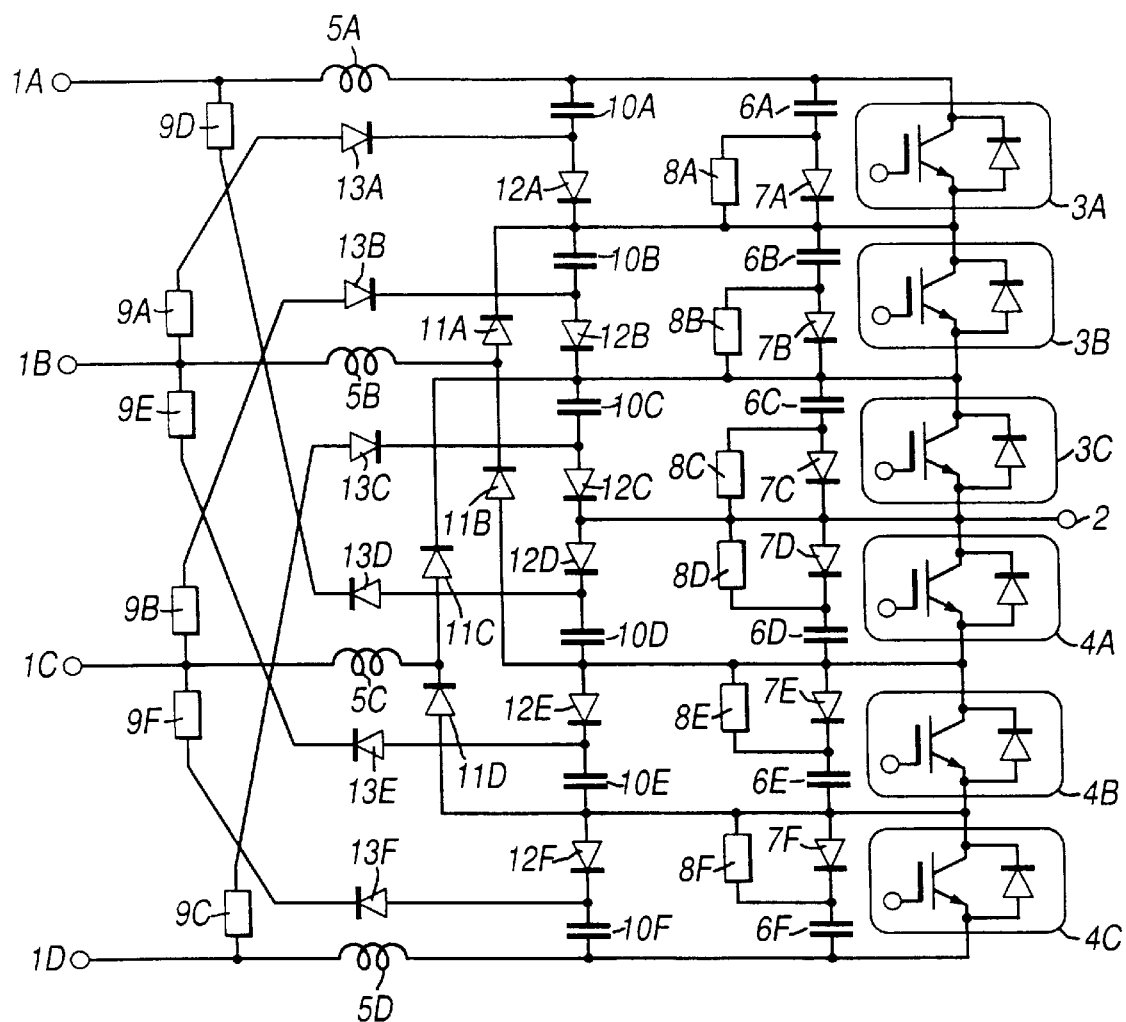
FIG. 4A is a circuit diagram showing a four-level inverter according to a fourth embodiment of this invention.

A fourth embodiment of the present invention will be described using FIG. 4A.

This fourth embodiment is a four-level inverter in the first embodiment with second snubber circuits such as charging/discharging snubber circuits added. The charging/discharging snubber circuit for positive side reverse-conducting switch 3A is composed of charging/discharging snubber capacitor 6A, charging/discharging snubber diode 7A and charging/discharging snubber resistor 8A. Charging/discharging snubber circuits for other reverse-conducting switches 3B, 3C and 4A–4C are also in the same construction.

When positive side reverse-conducting switch 3A is turned OFF, its voltage increases from 0 volts by the actions of charging/discharging snubber capacitor 6A and charging/discharging snubber diode 7A. If the voltage of positive side reverse-conducting switch 3A exceeds a voltage of clamp snubber capacitor 10A, clamp snubber diode 12A becomes the ON state, and the voltage of positive side reverse-conducting switch 3A is clamped by the voltage of clamp snubber capacitor 10A. As change in the voltage of clamp snubber capacitor 10A can be suppressed by increasing the capacity of clamp snubber capacitor 10A, it is possible to reduce a maximum voltage of positive side reverse-conducting switch 3A to a voltage (VA–VB), that is, VDC.

The construction and operations described above also apply to reverse-conducting switches 3B, 3C and 4A–4C.

According to this invention, by jointly using the charging/discharging snubber circuits and the clamp snubber circuits as described above, it is possible to increase voltages of reverse-conducting switches 3A–3C, 4A–4C from 0 volts when they are turned OFF, respectively. Further, as maximum voltages of reverse-conducting switches 3A–3C, 4A–4C are suppressed by clamp snubber capacitors 10A–10F, respectively, it is possible to prevent such a defect as recognized in conventional charging/discharging snubber circuits that the voltages of reverse-conducting switches 3C, 4A near AC output terminal 2 increases. Further, the second snubber circuits of this embodiment are applicable to a multi-phase system, as illustrated in FIGS. 4B(1) and 4B(2).

Figure 5:
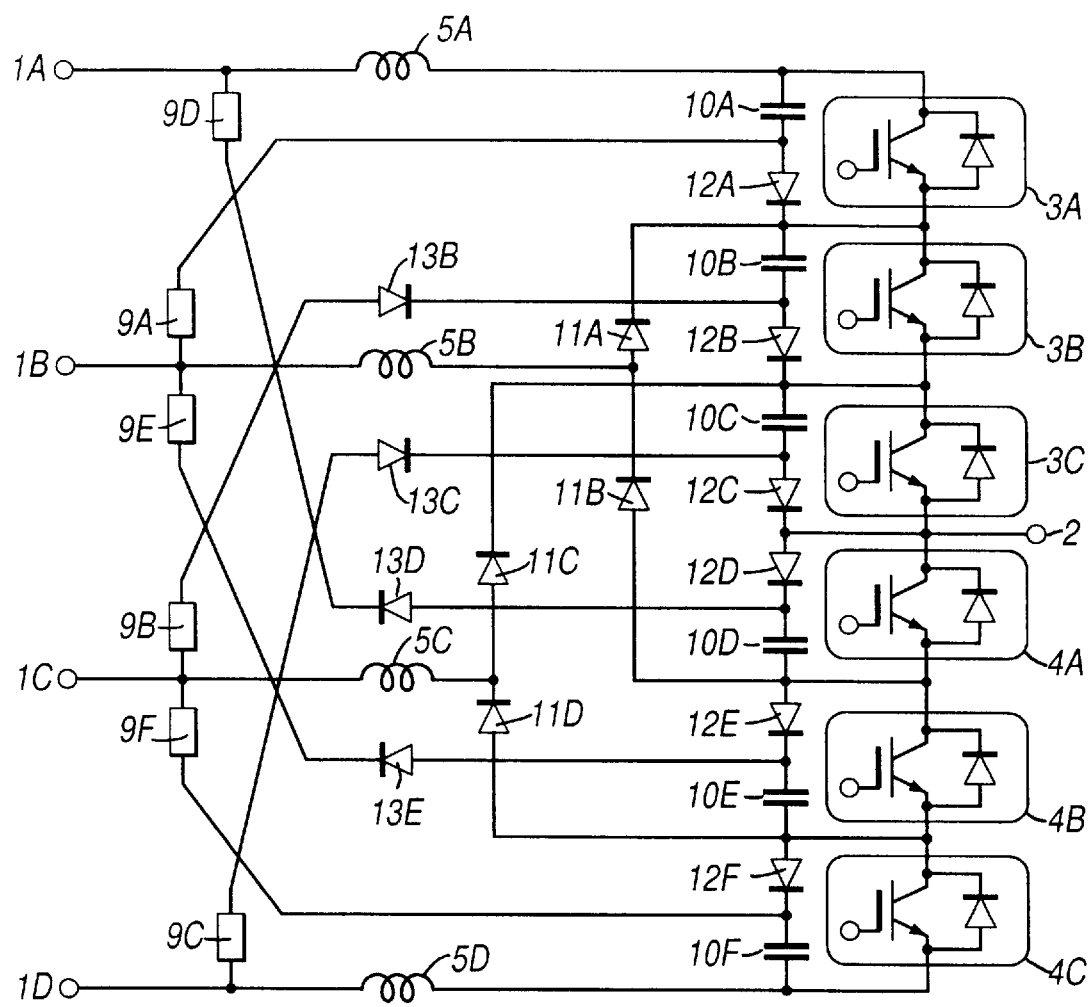
FIG. 5 is a circuit diagram showing a four-level inverter according to a fifth embodiment of this invention.

A fifth embodiment of the present invention will be described using FIG. 5.

This fifth embodiment is in the same construction as the four-level inverter in the first embodiment except that diodes 13A and 13F are omitted. In this embodiment, the discharging of clamp snubber capacitors 10A and 10F is carried out by clamp snubber resistors 9A and 9F not by way of diodes 13A and 13F, respectively. As a result, it becomes possible to provide a multi-level inverter of four-levels or more that is capable of suppressing snubber loss by fewer diodes 13B–13E. Further, other clamp snubber resistors 9B–9E discharge clamp snubber capacitors 10B–10F through diodes 13B–13E, respectively, likewise the first embodiment. Further, this embodiment is also applicable to the fourth embodiment.

Figure 6A:
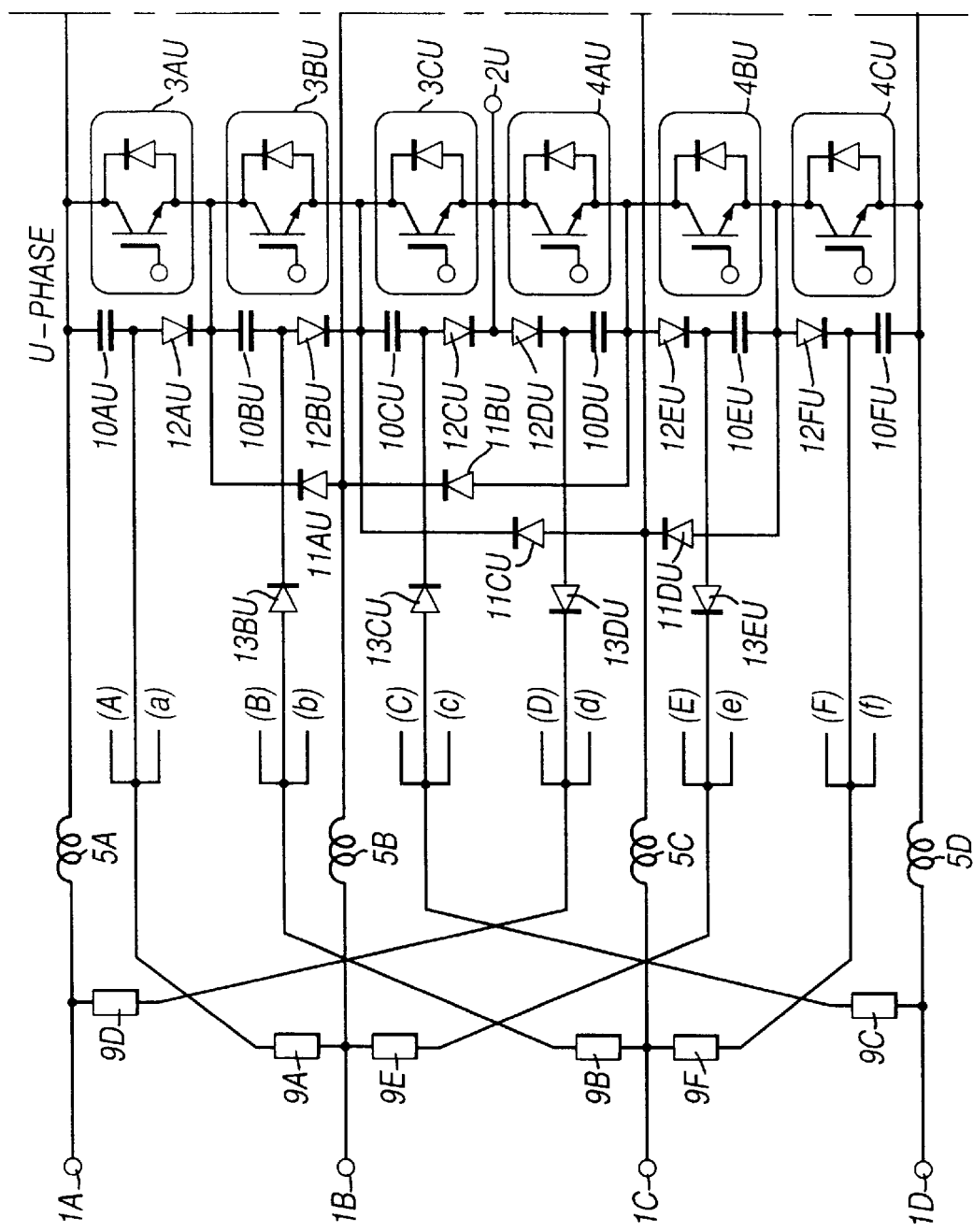
FIG. 6 is a circuit diagram showing a three-phase inverter according to a sixth embodiment of this invention.
Figure 6B:
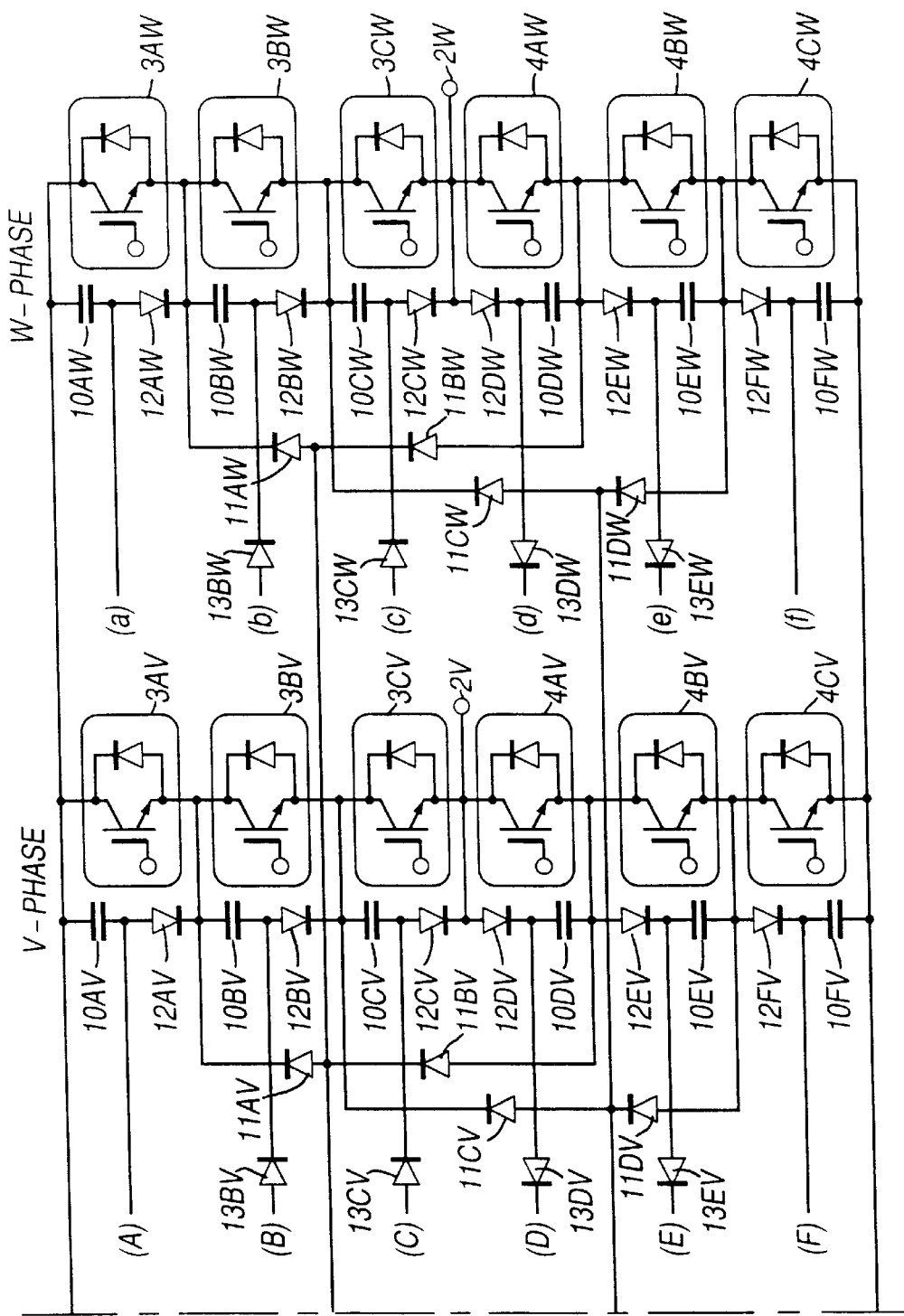

A sixth embodiment of the present invention will be described using FIG. 6.

The sixth embodiment is obtained by applying the four-level inverter in the fifth embodiment to a three-phase inverter. Here, in FIG. 6, (A)–(F) and (a)–(f) are connected between the same reference numerals, respectively.

The circuit operations of the sixth embodiment are the same as those described in the third embodiment. Clamp snubber resistors 9A–9F discharge clamp snubber capacitors 10AU, 10AV, 10AW–10FU, 10FV, 10FW of U, V, W-phases, respectively. However, the dischargings of clamp snubber capacitors 10AU–10AW and 10FU–10FW are respectively carried out not by way of diodes 13AU–13AW and 13FU–13FW as described in the fifth embodiment.

As described above, it is possible to reduce the number of clamp snubber resistors, and simplify circuits of the three-phase inverter by collecting clamp snubber resistors in three phases into one. Furthermore, it is possible to reduce snubber loss by fewer diodes. Further, the present invention is shown for a three-phase inverter in this embodiment. But this invention is also applicable to two-phase or more than four-phase inverters.

Figure 7A:
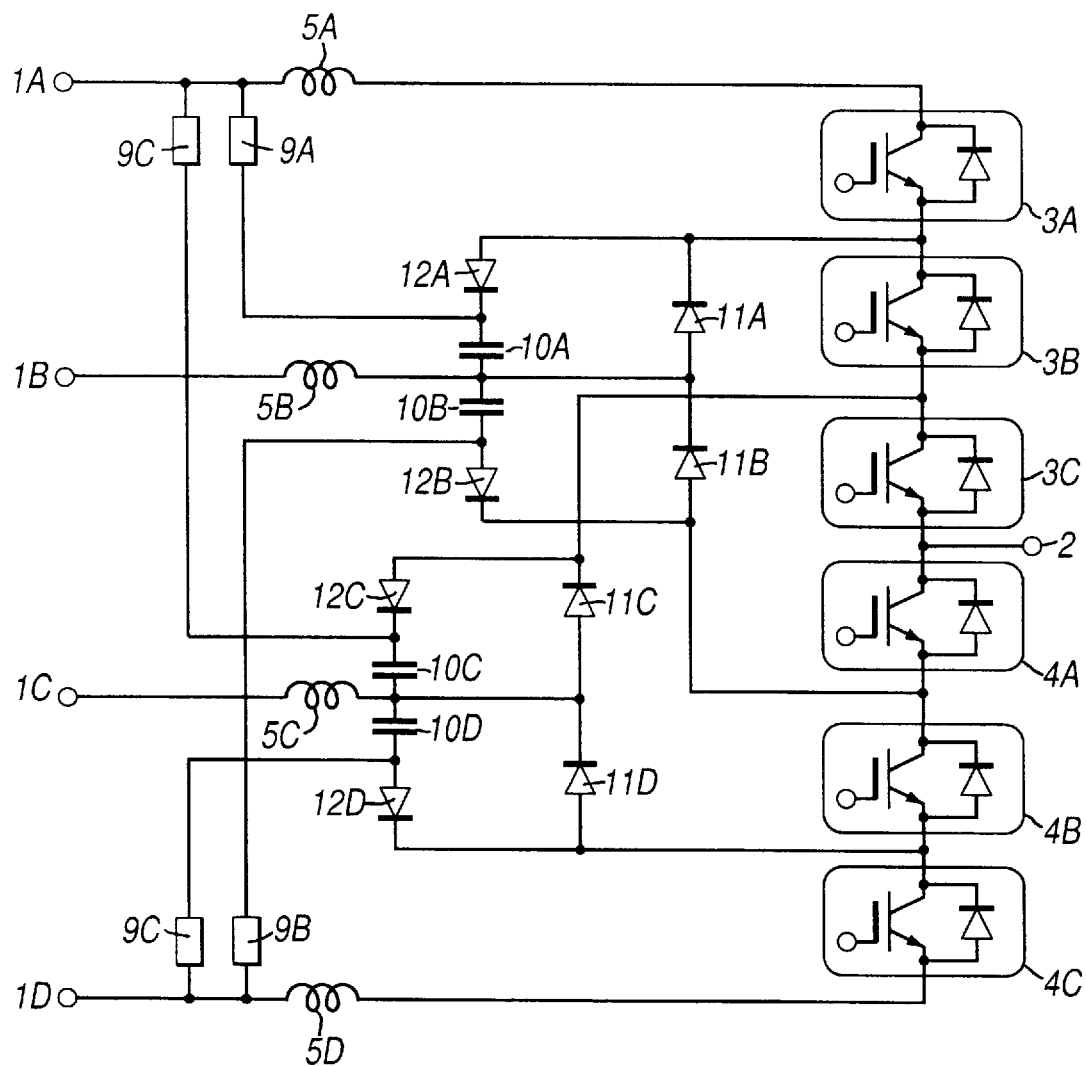
FIG. 7A is a circuit diagram showing a four-level inverter according to a seventh embodiment of this invention.

A seventh embodiment of this invention is described using FIG. 7A. FIG. 7A shows a four-level inverter with clamp snubber circuits. In FIG. 7A, there are provided DC input terminals 1A–1D, AC output terminal 2, a positive arm composed of series connected positive side reverse-conducting switches 3A–3C, and a negative arm composed of series connected negative side reverse-conducting switches 4A–4C. There are further provided stray inductances 5A–5D, clamp diodes 11A–11D, first snubber circuits such as clamp snubber circuits connected in parallel with clamp diodes 11A–11D composed of series connected clamp snubber capacitors 10A–10D and clamp snubber diodes 12A–12D, respectively, and discharging circuits composed of clamp snubber resistors 9A–9D, respectively.

When positive side reverse-conducting switch 3A is turned ON in the state wherein current is flowing through stray inductance 5B, clamp diode 11A and positive side reverse-conducting switch 3B, current flows in the course of stray inductance 5A, positive side reverse-conducting switch 3A, clamp diode 11A and stray inductance 5B. In general, there is a several microsecond delay until a diode is put in the OFF state after reverse current flows. Therefore, clamp diode 11A is put in the OFF state after current flowing through stray inductance 5B is turned to the reverse direction (the state wherein current flows from stray inductance 5B to DC input terminal 1B). Thus, a voltage of clamp diode 11A is increased by residual energy of stray inductance 5B. If this voltage exceeds a voltage of clamp snubber capacitor 10A, forward voltage is applied to clamp snubber diode 12A, which is then turned to the ON state. As a result, energy of stray inductance 5B is absorbed by clamp snubber capacitor 10A, and a maximum voltage of clamp diode 11A is clamped by the voltage of clamp snubber capacitor 10A. At this time, the voltage of clamp snubber capacitor 10A increases, but is discharged to VDC by clamp snubber resistor 9A. When the capacity of clamp snubber capacitor 10A is increased sufficiently large, it becomes possible to reduce the change in the voltage of clamp snubber capacitor 10A and to suppress the maximum voltage of clamp diode 11A to VDC.

Similarly, voltages of clamp snubber capacitors 10B–10D are charged/discharged so that they are made to 2×VDC, 2×VDC and VDC, respectively.

Thus, in a four-level inverter, it is possible to reduce maximum voltage of clamp diodes 11A–11D by clamp snubber capacitors 10A–10D, respectively. Further, it becomes possible to use clamp diodes having low withstand voltage and to increase maximum conversion voltage of inverters.

Further, it is also possible to apply this embodiment to two-phase or more inverters likewise the third embodiment.

Figure 7B:
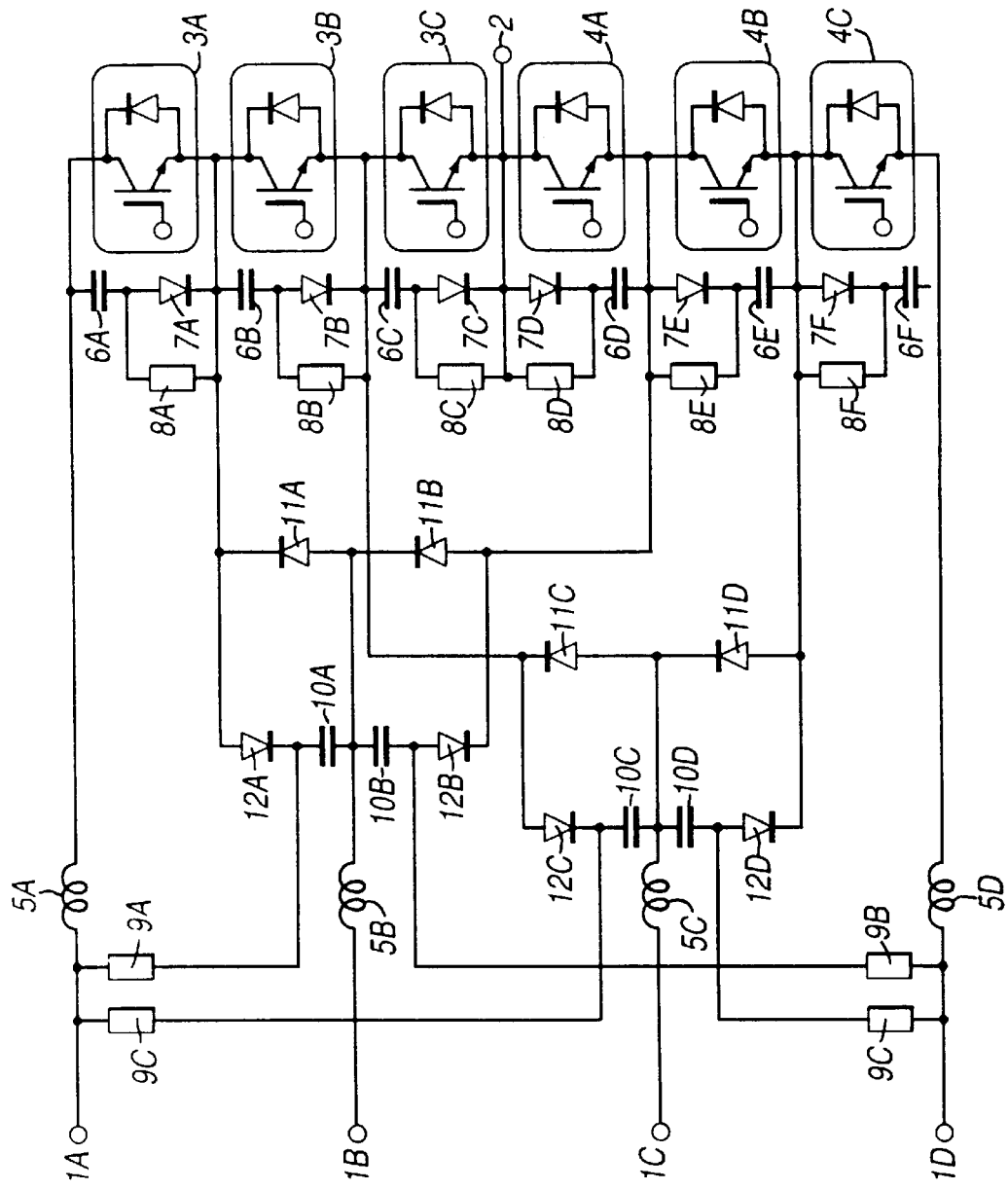
FIG. 7B is a modification of the seventh embodiment.

In addition, it is also possible to add the charging/discharging snubber circuits in parallel with respective reverse-conducting switches 3A–3C, 4A–4C likewise the fourth embodiment, as illustrated in FIG. 7B.

Figure 8:
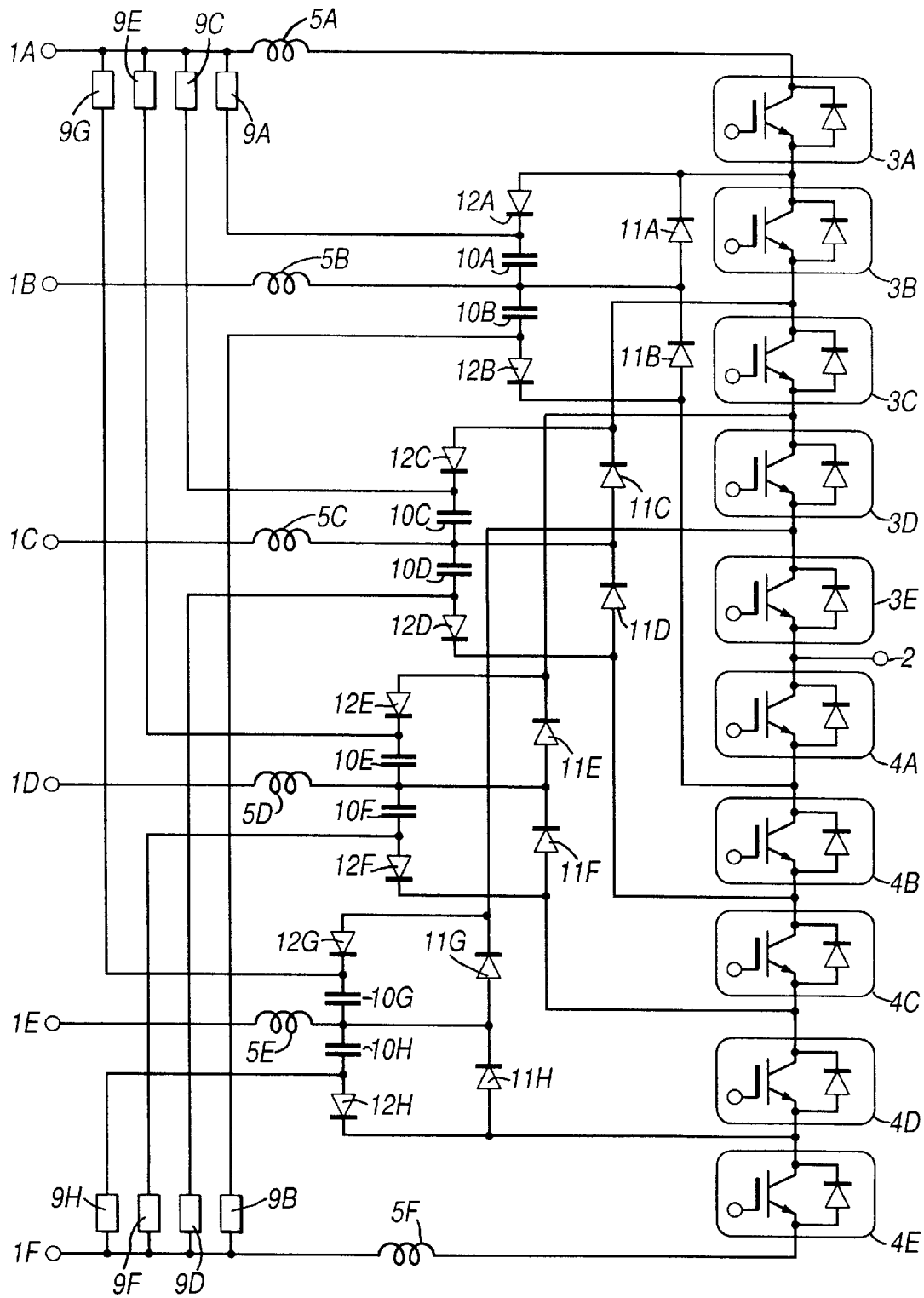
FIG. 8 is a circuit diagram showing a six-level inverter according to an eighth embodiment of this invention.

Next, an eighth embodiment of this invention is described using FIG. 8. This eighth embodiment is obtained by applying the seventh embodiment to a six-level inverter. In FIG. 8, there are provided DC input terminals 1A–1F, AC output terminal 2, a positive arm composed of series connected positive side reverse-conducting switches 3A–3E, and a negative arm composed of series connected negative side reverse-conducting switches 4A–4E. There are further provided stray inductances 5A–5F, clamp diodes 11A–11H, first snubber circuits such as clamp snubber circuits connected in parallel with clamp diodes 11A–11H composed of series connected clamp snubber capacitors 10A–10H and clamp snubber diodes 12A–12H, respectively, and discharging circuits composed of clamp snubber resistors 9A–9H, respectively.

In the eighth embodiment, the circuit operations are the same as the seventh embodiment. Maximum voltages of clamp diodes 11A–11H are clamped by clamp snubber capacitors 10A–10H, respectively. Voltages of clamp snubber capacitors 10A–10H are charged/discharged so that they are made to VDC, 4×VDC, 2×VDC, 3×VDC, 3×VDC, 2×DC, 4×VDC and VDC, respectively by clamp snubber resistors 9A–9H.

Figure 9:
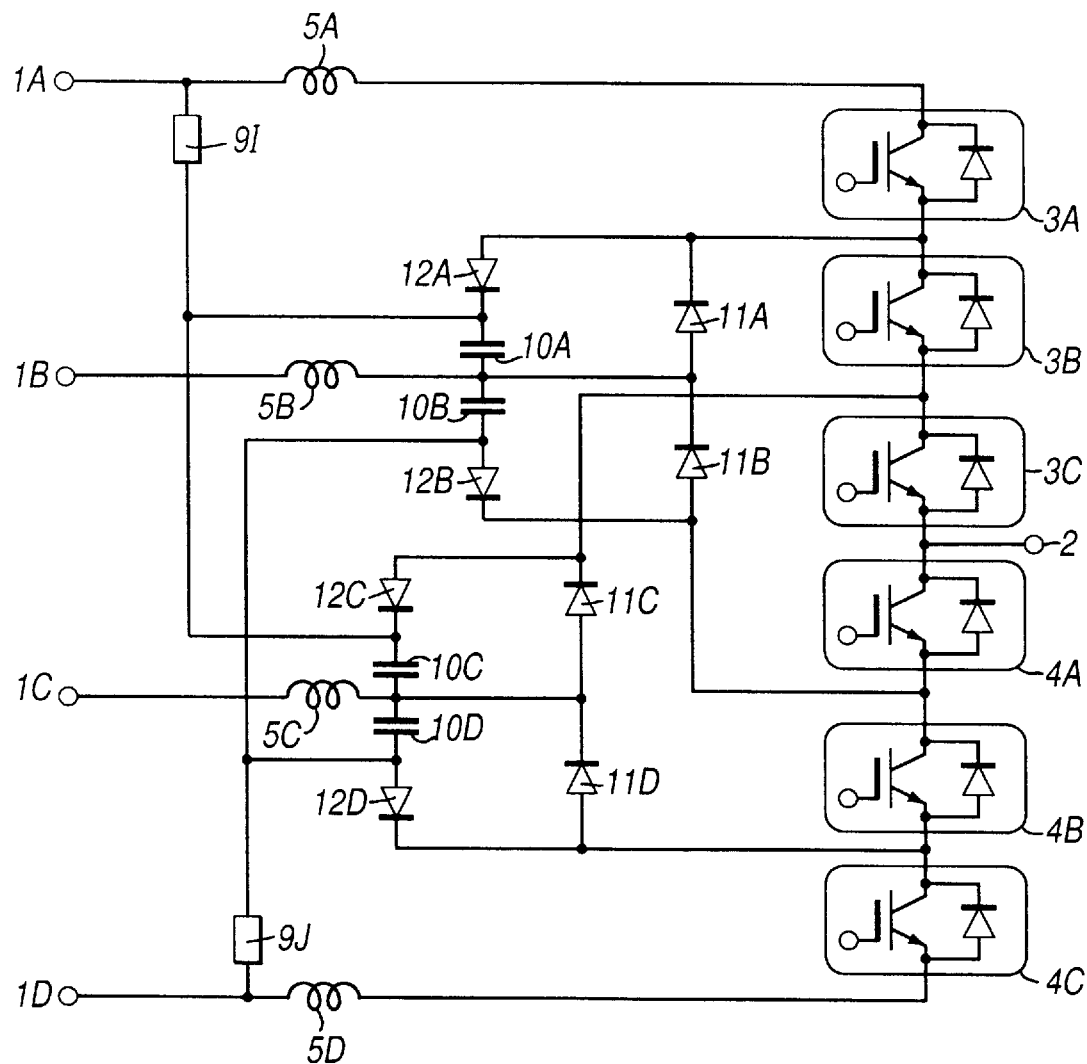
FIG. 9 is a circuit diagram showing a four-level inverter according to a ninth embodiment of this invention.
Figure 11:
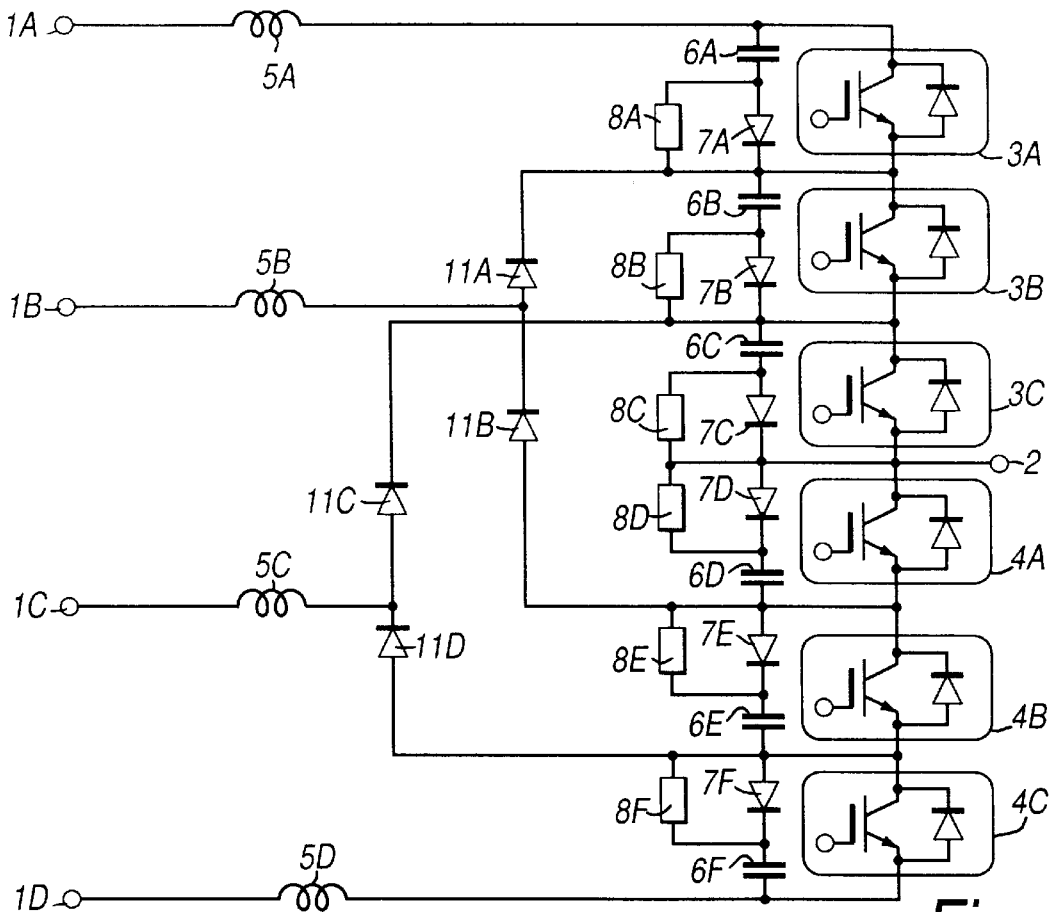
FIG. 11 is a circuit diagram showing one example of a conventional four-level inverter with conventional charging/discharging snubber circuits.
Figure 12:
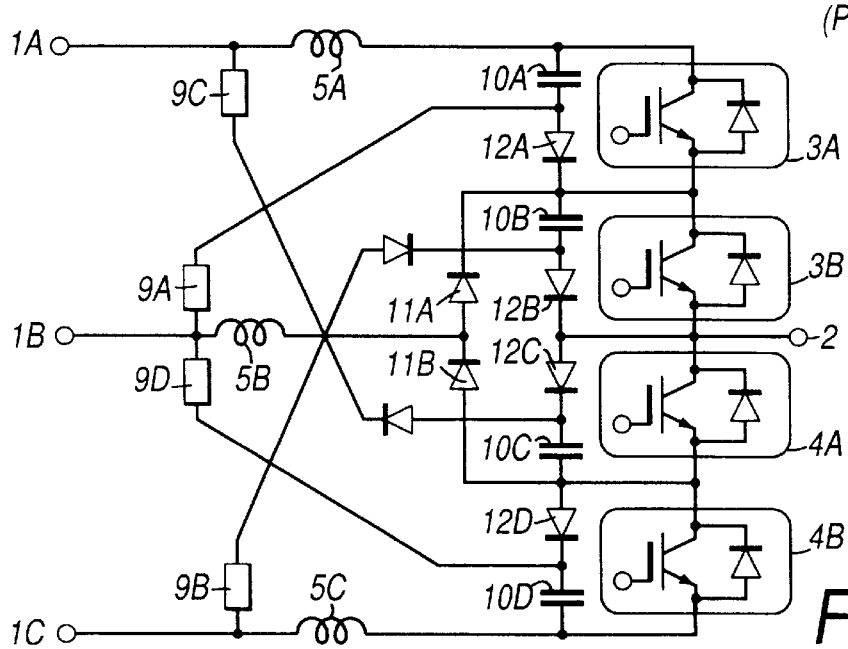
FIG. 12 is a circuit diagram showing one example of a conventional three-level inverter with clamp snubber circuits.
Figure 13:
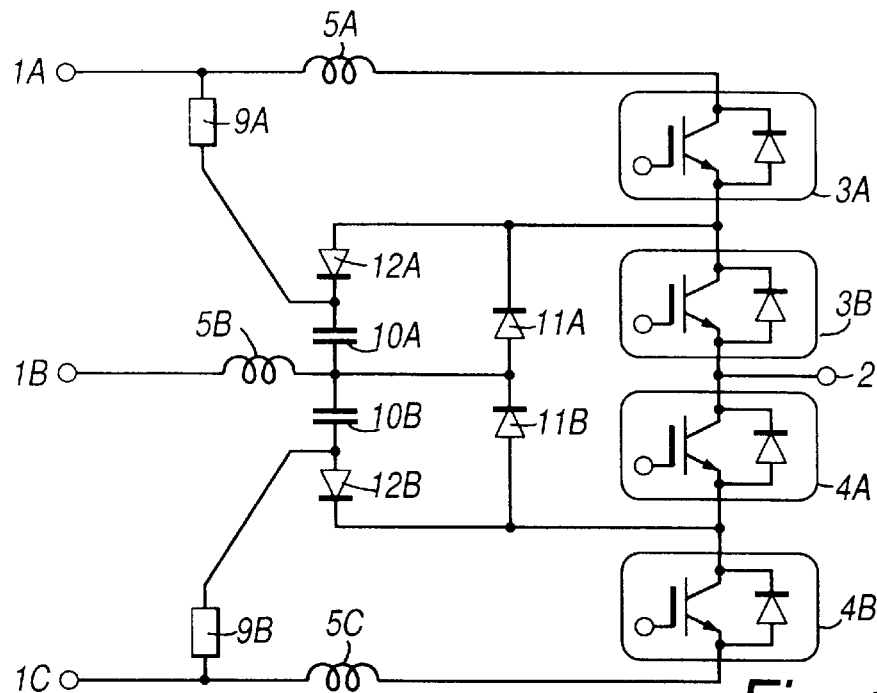
FIG. 13 is a circuit diagram showing another example of a conventional three-level inverter with clamp snubber circuits.

A ninth embodiment of the present invention will be described using FIG. 9.

In the seventh embodiment shown in FIG. 7A, clamp snubber resistors 9A–9D are individually provided for respective clamp snubber capacitors 10A–10D. In this ninth embodiment, however, clamp snubber resistors are commonly provided for clamp snubber capacitors; that is, a clamp snubber resistor 9I is commonly provided for clamp snubber capacitors 10A and 10C and clamp snubber resistor 9J is commonly provided for clamp snubber capacitors 10B and 10D.

According to this embodiment, it is possible to reduce the number of clamp snubber resistors, and to simplify circuit configurations. As a result, it is possible to provide multi-level inverters of four level or more, capable of suppressing snubber loss by fewer clamp snubber resistors.

A tenth embodiment of the present invention will be described using FIGS. 10A(1) and 10A(2).

This tenth embodiment is obtained by applying the ninth embodiment to a three-phase inverter. Here, in FIG. 10, (A)–(D) and (a)–(d) are connected between same reference numerals, respectively. According to this embodiment, it is possible to reduce the number of clamp snubber resistors and simplify the circuit configurations by commonly using three-phase clamp snubber resistors 9I, 9J. Further, the present invention applied to three-phase inverters is shown in this embodiment, but the present invention is also similarly applicable to two-phase or four-phase or more inverters. Further, the second snubber circuits of this embodiment are applicable to a multi-phase system, as illustrated in FIGS. 10B(1) and 10B(2).

Figure 14:
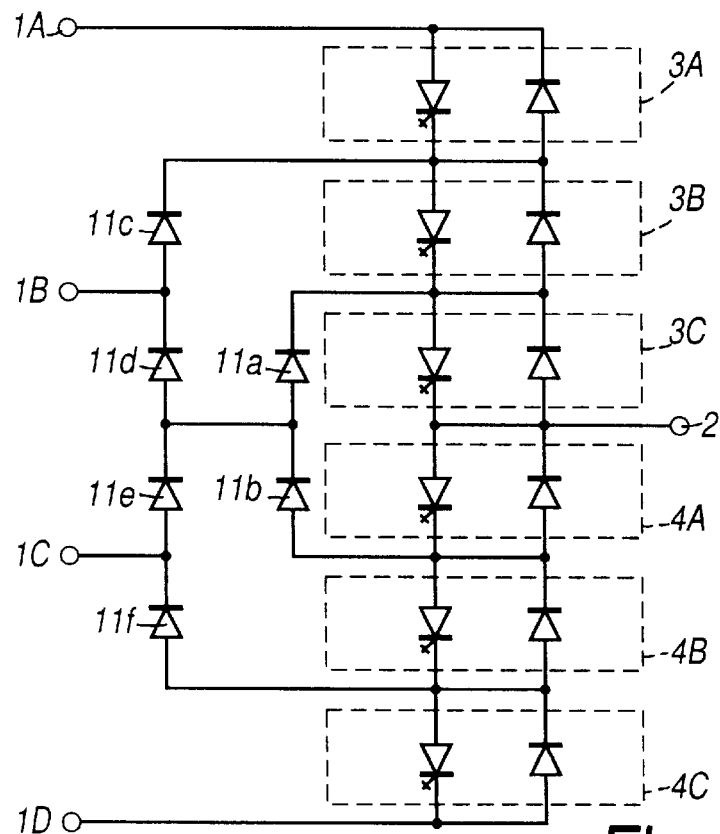
FIG. 14 is a circuit diagram showing another example of a conventional four-level inverter.

In all of the embodiments of this invention, this invention is applied to a multi-level inverter with the construction in which clamp diodes are connected as shown in, for example, FIG. 1. But this invention is not limited to these embodiments. This invention can also be applied to a multi-level inverter with the construction in which clamp diodes 11a–11f are connected as shown in FIG. 14.

As described above, according to this invention it is possible to provide a multi-level inverter of four-level outputs or more which can suppress surge voltages and thereby can suppress the loss of snubber circuits in the multi-level inverter, using clamp snubber circuits.

Obviously, numerous modifications and variations of the present invention are possible in light of the above teachings. It is therefore to be understood that within the scope of the appended claims, the invention may be practiced otherwise than as specifically described herein.

What is claimed is:
1. A multi-level inverter, comprising:
an AC output terminal;
at lease four DC input terminals with different potentials including a first DC input terminal with a maximum potential and a second DC input terminal with a minimum potential;
a positive arm connected between said first DC input terminal and said AC output terminal;
a negative arm connected between said second DC input terminal and said AC output terminal;
each of said positive and negative arms including a plurality of series connected switching devices;
a plurality of clamp diodes, each corresponding to one of said DC input terminals other than said first and second DC input terminals and also corresponding to one of said positive and negative arms, each of the plurality of clamp diodes connected between the corresponding DC input terminal and the corresponding arm;
a plurality of first snubber circuits, each corresponding to one of said switching devices and including a series circuit of a snubber capacitor and a snubber diode and connected in parallel with the corresponding one of said switching devices; and
a plurality of discharging circuits, each corresponding to one of said first snubber circuits and one of said DC input terminals, each of the plurality of discharging circuits including at least a resistor and connected between the corresponding snubber circuit and the corresponding DC input terminals.

2. The multi-level inverter according to claim 1, further comprising:
a plurality of second snubber circuits each corresponding to one of said switching devices, each of said plurality of second snubber circuits composed of a snubber capacitor, a snubber diode and a snubber resistor and connected in parallel with the corresponding switching device.

3. The multi-level inverter according to claim 1 or claim 2, wherein:
each of said discharging circuit further includes a diode.

4. A multi-phase multi-level inverter, comprising:
at least four DC input terminals with different potentials including a first DC input terminal with a maximum potential and a second DC input terminal with a minimum potential;
a plurality of circuit groups, each group including,
an AC output terminal,
a positive arm connected between said first DC input terminal and said AC output terminal,
a negative connected between said first DC terminal said AC,
a negative connected between said second DC terminal and said AC output terminal,
each of said positive and negative arms including a plurality of series connected switching devices;
a plurality of clamp diodes, each corresponding to one of said DC input terminals other than said first and second DC input terminals and also corresponding to one of said positive and negative arms, each of the plurality of clamp diodes connected between the corresponding DC input terminal and the corresponding arm; and
a plurality of first snubber circuits, each corresponding to one of said switching devices and including a series circuit of a snubber capacitor and a snubber diode and connected in parallel with the corresponding one of said switching devices, respectively; and
a plurality of discharging circuits corresponding to said DC input terminals and said first snubber circuits, each of one of said groups of the discharging circuits including at least a resistor and connected between the corresponding first snubber circuit and the corresponding DC input terminal.

5. The multi-phase multi-level inverter according to claim 4, wherein:
each of said groups further includes a plurality of second snubber circuits corresponding to the switching devices of the groups, each of the plurality of second snubber circuits including a snubber capacitor, a snubber diode and a snubber resistor and connected in parallel with the corresponding switching device.

6. A multi-level inverter, comprising:

an AC output terminal;

at least four DC input terminals with different potentials including a first DC input terminal with a maximum potential and a second DC input terminal with a minimum potential;

a positive arm connected between said first DC input terminal and said AC output terminal;

a negative arm connected between said second DC input terminal and said AC output terminal;

each of said positive and negative arms including a plurality of series connected switching devices;

a plurality of clamp diodes, each corresponding to one of said DC input terminals other than said first and second DC input terminals and also corresponding to one of said positive and negative arms, each of the plurality of clamp diodes connected between the corresponding DC input terminal and the corresponding arm;

a plurality of first snubber circuits, each corresponding to one of said switching devices and including a series circuit of a snubber capacitor and a snubber diode and connected in parallel with the corresponding one of said switching devices; and a plurality of discharging circuits each corresponding to one of said first snubber circuits, each of the discharging circuit including at least a resistor and connected between the corresponding snubber circuit and one of said first second DC input terminals.

7. The multi-level inverter according to claim 6, further comprising:

a plurality of second snubber circuits corresponding to the switching devices, each of the second snubber circuits including a snubber capacitor, a snubber diode and a snubber resistor and connected in parallel with the corresponding switching device.

8. A multi-phase multi-level inverter, comprising:

at least four DC input terminals with different potentials including a first DC input terminal with a maximum potential and a second DC input terminal with a maximum potential and a second DC input terminal with a minimum potential, a plurality of circuit groups, each group including, an AC output terminal, at least four DC input terminals with different potentials including a first DC input terminal with a maximum potential and a second DC input terminal with a minimum potential, a positive arm connected between said first DC input terminal and said AC output terminal, a negative arm connected between said second DC input terminal and said AC output terminal, each of said positive and negative arms including a plurality of series connected switching devices, respectively, a plurality of clamp diodes, each corresponding to one of said DC input terminals other than said first and second DC input terminals and also corresponding to one of said positive and negative arms, each of the plurality of clamp diodes connected between the corresponding DC input terminal and the corresponding arm, and a plurality of first snubber circuits, each corresponding to one of said switching devices and including a series circuit of a snubber capacitor and a snubber diode and connected in parallel with the corresponding one of said switching devices, respectively; and a plurality of discharging circuits each corresponding to one of said first snubber circuits, each of the second snubber circuits including at least a resistor and connected between the corresponding first snubber circuit in one of said groups, and one of said first and second DC input terminals.

9. The multi-phase multi-level inverter according to claim 8, wherein:

each of said groups further includes a plurality of second snubber circuits corresponding to said switching devices, each of said second snubber circuits including a snubber capacitor, a snubber diode and a snubber resistor and connected in parallel with the corresponding switching device.

* * * * *